United States Patent
Zhang et al.

(10) Patent No.: US 10,263,677 B2
(45) Date of Patent: *Apr. 16, 2019

(54) METHODS AND SYSTEMS FOR ENABLING FEEDBACK IN WIRELESS COMMUNICATION NETWORKS

(71) Applicant: APPLE INC., Cupertino, CA (US)

(72) Inventors: Hang Zhang, Nepean (CA); Mo-Han Fong, L'Orignal (CA); Peiying Zhu, Kanata (CA); Jianglei Ma, Kanata (CA); Wen Tong, Ottawa (CA)

(73) Assignee: APPLE INC., Cupertino, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/685,252

(22) Filed: Apr. 13, 2015

(65) Prior Publication Data
US 2015/0215921 A1 Jul. 30, 2015

Related U.S. Application Data

(63) Continuation of application No. 13/342,654, filed on Jan. 3, 2012, now Pat. No. 9,008,013, which is a (Continued)

(51) Int. Cl.
*H04B 7/0456* (2017.01)
*H04B 7/06* (2006.01)
(Continued)

(52) U.S. Cl.
CPC ......... *H04B 7/0478* (2013.01); *H04B 7/0413* (2013.01); *H04B 7/0617* (2013.01);
(Continued)

(58) Field of Classification Search
CPC .................................................. H04B 7/0671
See application file for complete search history.

(56) References Cited

U.S. PATENT DOCUMENTS 7,616,706 B2 * 11/2009 Koslov ............ H04B 7/18517
375/316
2001/0019592 A1 9/2001 Solondz
(Continued)

FOREIGN PATENT DOCUMENTS

CN 1267153 9/2000
CN 1479983 3/2004
(Continued)

OTHER PUBLICATIONS

"Enhanced MAC Support for MIMO OFDMA" May 17, 2004 Wonil Roh, Seungjoo Maeng, Jiho Jang, Panyuh Joo, Jaeho Jeon, Soon Young Yoon IEEE 802.16 Broadband wireless access working group.*

(Continued)

*Primary Examiner* — Kevin M Cunningham
(74) *Attorney, Agent, or Firm* — Fay Kaplun & Marcin, LLP

(57) ABSTRACT

Aspects of the present invention provide additional MAC functionality to support the PHY features of a wireless communication system framework. The additional MAC functionality aids in enabling feedback from wireless terminals to base stations. In some aspects of the invention the feedback is provided on an allocated feedback channel. In other aspects of the invention the feedback is provided by MAC protocol data units (PDU) in a header, mini-header, or subheader. The feedback may be transmitted from the wireless terminal to the base station autonomously by the wireless terminal or in response to an indication from the base station that feedback is requested. Aspects of the invention also provide for allocating feedback resources to form a dedicated feedback channel. One or more of these enhancements is included in a given implementation. Base stations
(Continued)

and wireless terminals are also described upon which methods described herein can be implemented.

19 Claims, 15 Drawing Sheets

Related U.S. Application Data continuation of application No. 11/630,385, filed as application No. PCT/CA2005/000959 on Jun. 22, 2005, now Pat. No. 8,116,262.

(60) Provisional application No. 60/642,697, filed on Jan. 10, 2005, provisional application No. 60/619,461, filed on Oct. 15, 2004, provisional application No. 60/614,621, filed on Sep. 30, 2004, provisional application No. 60/601,178, filed on Aug. 13, 2004, provisional application No. 60/582,298, filed on Jun. 24, 2004, provisional application No. 60/581,356, filed on Jun. 22, 2004.

(51) Int. Cl.
*H04L 5/00* (2006.01)
*H04W 48/08* (2009.01)
*H04B 7/0413* (2017.01)
*H04W 72/04* (2009.01)
*H04W 72/08* (2009.01)
*H04W 74/06* (2009.01)
*H04L 5/02* (2006.01)
*H04L 27/26* (2006.01)

(52) U.S. Cl.
CPC ......... *H04B 7/0619* (2013.01); *H04B 7/0671* (2013.01); *H04B 7/0673* (2013.01); *H04B 7/0691* (2013.01); *H04L 5/005* (2013.01); *H04L 5/0028* (2013.01); *H04L 5/023* (2013.01); *H04W 48/08* (2013.01); *H04W 72/042* (2013.01); *H04W 72/08* (2013.01); *H04W 74/06* (2013.01); *H04L 5/006* (2013.01); *H04L 5/0007* (2013.01); *H04L 5/0023* (2013.01); *H04L 27/2601* (2013.01); *H04W 72/044* (2013.01)

(56) References Cited

U.S. PATENT DOCUMENTS

| | | | |
|---|---|---|---|
| 2003/0033530 A1* | 2/2003 | Sharma | G06K 9/00442 713/176 |
| 2003/0161282 A1 | 8/2003 | Medvedev et al. | |
| 2003/0210646 A1 | 11/2003 | Ohseki et al. | |
| 2003/0231706 A1 | 12/2003 | Hwang | |
| 2003/0235147 A1 | 12/2003 | Walton et al. | |
| 2004/0082356 A1* | 4/2004 | Walton | H04B 7/022 455/522 |
| 2004/0152458 A1* | 8/2004 | Hottinen | H04W 88/06 455/423 |
| 2007/0274253 A1* | 11/2007 | Zhang | H04B 7/0697 370/328 |
| 2008/0268844 A1* | 10/2008 | Ma | H04W 36/30 455/436 |

FOREIGN PATENT DOCUMENTS

| | | |
|---|---|---|
| EP | 1 043 861 | 10/2000 |
| EP | 1 357 689 | 10/2003 |
| WO | 02/43314 | 5/2002 |
| WO | 02/096011 | 11/2002 |

OTHER PUBLICATIONS

Ye (Geoffrey) Li et al: "Transmitter Diversity for OFDM Systems and Its Impact on High-Rate Data Wireless Networks", IEEE Journal on Selected Areas in Communications, IEEE Service Center, Piscataway, US, vol. 17, No. 7, Jul. 1, 1999 (Jul. 1, 1999 ), XP011054988, ISSN: 0733-8716.

Al-Dhahir N et al: "Algebraic properties of space-time block codes in intersymbol interference multiple-access channels", IEEE Transactions on Information Theory, IEEE Press, USA, vol. 49, No. 10, Oct. 1, 2003 (Oct. 1, 2003 ), pp. 2403-2414, XP011102230, ISSN: 0018-9448, DOI: 10.1109/TIT.2003.817833.

Kawamoto J et al: "Comparison of space division multiplexing schemes employing multiple antennas in OFDM forward link", Vehicular Technology Conference, 2003. VTC 2003-Fall. 2003 IEEE 58th Orlando, FL, USA Oct. 6-9, 2003;[IEEE Vehicular Technology Conference], Piscataway, NJ, USA, IEEE, US, Oct. 6, 2003 (Oct. 6, 2003), pp. 452-457vol. 1, XP010701016, DOI: 10.1109/VETECF.2003.1285058 ISBN: 978-0-7803-7954-1.

Babak Hassibi et al: "High-Rate Codes That Are Linear in Space and Time", IEEE Transactions on Information Theory, IEEE Press, USA, vol. 48, No. 7, Jul. 1, 2002 (Jul. 1, 2002), XP011074516, ISSN: 0018-9448.

Liu K J R et al: "Obtaining full-diversity space-frequency codes from space-time codes via mapping", IEEE Transactions on Signal Processing, IEEE Service Center, New York, NY, US, vol. 51, No. 11, Nov. 1, 2003 (Nov. 1, 2003), pp. 2905-2916, XP011102805, ISSN: 1053-587X, DOI: 10.1109/TSP.2003.818200.

Girish Ganesan et al: "Space-Time Block Codes: A Maximum SNR Approach" IEEE Transactions on Information Theory, IEEE Press, USA, vol. 47, No. 4, May 1, 2001 (May 1, 2001 ), XP011027942, ISSN: 0018-9448.

Su W et al: "On Space-Time Block Codes From Complex Orthogonal Designs", Wireless Personal Communications, Springer, Dordrecht, NL, vol. 25, No. 1, Apr. 1, 2003 (Apr. 1, 2003), pp. 1-26, XP001161537, ISSN: 0929-6212, DOI: 10.1023/A:1023688509457.

Ouachani I et al: "Trading rate versus diversity in space—time-frequency block coding schemes", Control, Communications and Signal Processing, 2004. First International Symposium on Hammamet, Tunisia Mar. 21-24, 2004, Piscataway, NJ, USA,IEEE, Mar. 21, 2004 (Mar. 21, 2004 ), pp. 171-17 4, XP010705669, DOI: 10.1109/ISCCSP.2004.1296245 ISBN: 978-0-7803-8379-1.

* cited by examiner

METHODS AND SYSTEMS FOR ENABLING FEEDBACK IN WIRELESS COMMUNICATION NETWORKS

RELATED APPLICATIONS

This application is a continuation of U.S. patent application Ser. No. 11/630,385, filed Dec. 22, 2006, which is the National Stage of International Patent Application No. PCT/CA2005/000959, filed Jun. 22, 2005, which claims the benefit of U.S. Provisional Patent Application No. 60/581,356 filed on Jun. 22, 2004, U.S. Provisional Patent Application No. 60/582,298 filed on Jun. 24, 2004, U.S. Provisional Patent Application No. 60/601,178 filed on Aug. 13, 2004, U.S. Provisional Patent Application No. 60/614,621 filed on Sep. 30, 2004, U.S. Provisional Patent Application No. 60/619,461 filed on Oct. 15, 2004 and U.S. Provisional Patent Application No. 60/642,697 filed on Jan. 10, 2005, all of which are hereby incorporated by reference in their entirety.

FIELD OF THE INVENTION

The invention relates to wireless communication systems, in particular devices and methods for providing feedback from wireless terminals to base stations.

BACKGROUND OF THE INVENTION

Wireless metropolitan area networks (MAN) are networks implemented over an air interface for fixed, portable, and mobile broadband access systems. Some wireless MANs utilize orthogonal frequency division multiplexing (OFDM) for signaling between mobile terminals and base stations. OFDM is a form of multiplexing that distributes data over a number of carriers that have a very precise spacing in the frequency domain. The precise spacing of the carriers provides several benefits such a high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Orthogonal frequency division multiple access (OFDMA) is a multiple access technology that utilizes OFDM techniques.

MIMO antenna systems are also being considered for incorporation into wireless MANs. MIMO systems use multiple transmitting and multiple receiving antennas for communication of information. MIMO antenna systems allow spatial diversity. Spatial diversity that takes advantage of transmitting data from multiple sources that have a known physical spacing.

Currently there are methodologies for dealing with particular aspects of wireless MAN, for example OFDM communications. However, these methodologies do not deal with ways to incorporate the newer concepts of MIMO. In addition, both MIMO and non-MIMO wireless MANs are continuing to introduce and support additional functionality that requires numerous additional types of feedback information to be transmitted from the wireless terminal to the base station. In some cases the feedback mechanisms of the current methodologies cannot support the transmission of the additional number of types of feedback information. Furthermore, the current methodologies are limited in the capacity of information that they can feedback from the wireless terminal to the base station.

SUMMARY OF THE INVENTION

According to a first aspect of the invention, there is provided a method in a wireless terminal for enabling feedback in an uplink transmission of a communication system from the wireless terminal to a base station, the method comprising: the wireless terminal transmitting feedback information in a MAC feedback protocol data unit (PDU) of a data frame, the feedback information comprising feedback type and feedback content, wherein the wireless terminal transmitting feedback information is performed subsequent to the wireless terminal autonomously transmitting on a dedicated feedback channel an indication that the wireless terminal has feedback information to transmit.

According to a second aspect of the invention, there is provided a method in a wireless terminal for enabling feedback in an uplink transmission of a communication system from the wireless terminal to a base station, the method comprising: the wireless terminal receiving an indication of a type of feedback information being requested by the base station in an information element in an uplink resource allocation portion of a data frame; in response to receiving the information element, the wireless terminal transmitting feedback information in a MAC feedback protocol data unit (PDU) of the data frame, the feedback information comprising feedback type and feedback content.

According to a third aspect of the invention, there is provided a method in a wireless terminal for enabling feedback in an uplink transmission of a communication system from the wireless terminal to a base station, the method comprising: the wireless terminal receiving a polling indication of a type of feedback information requested by the base station, the polling indication being an information element in an uplink resource allocation portion of a data frame; in response to receiving the polling indication, the wireless terminal transmitting feedback information in a feedback channel of the data frame.

According to a fourth aspect of the invention, there is provided a method in a base station for enabling feedback in an uplink transmission of a communication system from a wireless terminal to a base station, the method comprising: the base station transmitting a location in a data frame for allocating requested feedback information to be received by the base station, the base station transmitting the location in an information element in an uplink resource allocation portion of the data frame.

According to a fifth aspect of the invention, there is provided a method in a base station for enabling feedback in an uplink transmission of a communication system from a wireless terminal to a base station, the method comprising: the base station transmitting an indication of a type of feedback information requested by the base station, the indication comprising an information element in an uplink resource allocation portion of a date frame.

According to a sixth aspect of the invention, there is provided a method for dynamically allocating at least one feedback channel to a wireless terminal in a MIMO-OFDM system, the method comprising: a base station transmitting to the wireless terminal in a data frame: 1) a unique identifier of feedback channel resources including at least one feedback channel assigned to the wireless terminal; 2) a location of the feedback channel resources in the data frame; 3) a total number of the at least one feedback channels included in the feedback channel resources associated with the unique identifier; 4) for each of the at least one feedback channel of the feedback channel resources associated with the unique identifier, the base station transmitting to the wireless terminal: i) a feedback type to be transmitted by the wireless terminal to the base station; ii) a feedback channel type to be transmitted by the wireless terminal to the base station; iii) if the feedback type is a MIMO mode or permutation mode feedback type, a feedback cycle for transmitting feedback information pertaining to a transmission channel between the base station and the wireless terminal.

According to a seventh aspect of the invention, there is provided a method in a base station for enabling feedback in an uplink transmission of a closed-loop communication system from at least one wireless terminal to a base station, the method comprising: transmitting a request for feedback information and an allocation of uplink resources comprising at least one feedback channel in one or more data frames on which the at least one wireless terminal is to transmit the requested feedback information to the base station; receiving the feedback information in accordance with the request on the at least one allocated feedback channel in the one or more data frames, until all the requested feedback information is received by the base station.

According to an eighth aspect of the invention, there is provided a method for enabling feedback in an uplink transmission of a closed-loop communication system from a wireless terminal to a base station, the method comprising: the wireless terminal transmitting a message comprising feedback content, the format of the feedback content determined by a format index that is an indication of a respective transmission format of the feedback content.

According to a ninth aspect of the invention, there is provided a method for enabling feedback in an uplink transmission of a closed-loop communication system from a wireless terminal to a base station, the method comprising: the base station transmitting a request message for feedback to be received from the wireless terminal, the format of the feedback determined by a format index that is an indication of a transmission format of the feedback content.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In order to facilitate downlink data transmission by a base station, some feedback information, such as C/I (carrier-to-interference) measurements, and/or wireless terminal indications, such as MIMO/permutation modes, are sent from a wireless terminal. The MAC layer of a network can be used to facilitate this feedback of information.

Figure 1:
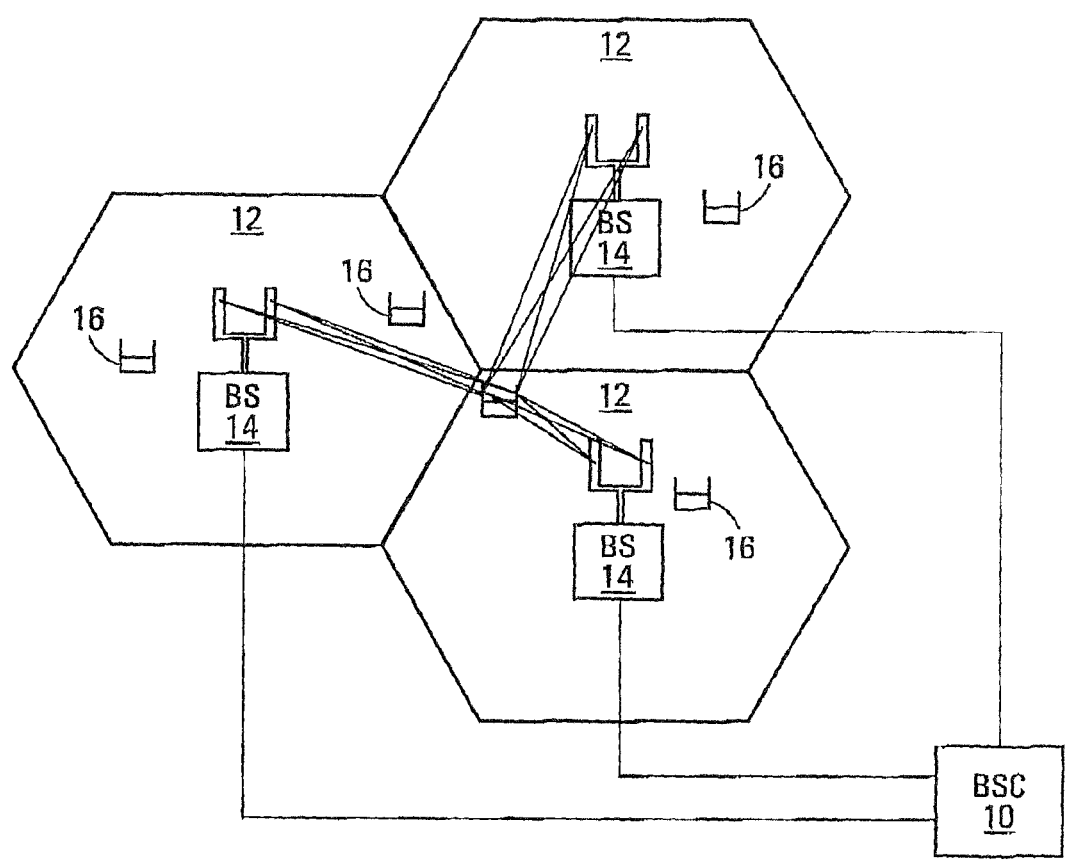
FIG. 1 is a block diagram of a cellular communication system.

For the purposes of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
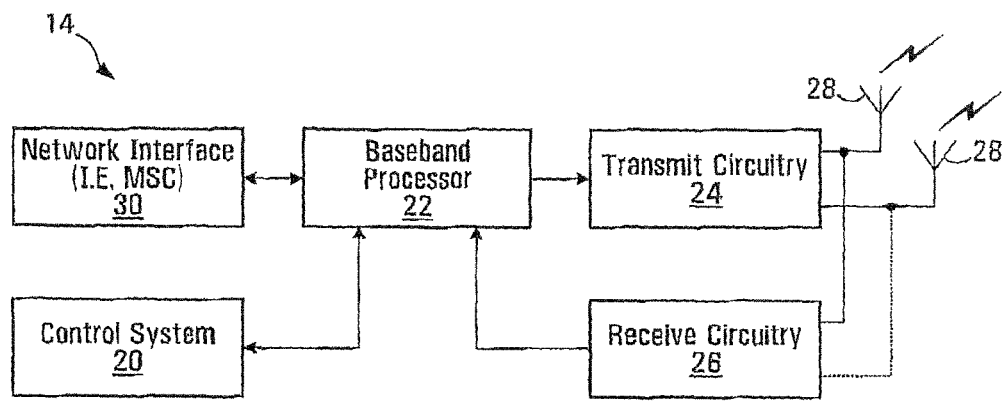
FIG. 2 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 2, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 1). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 3:
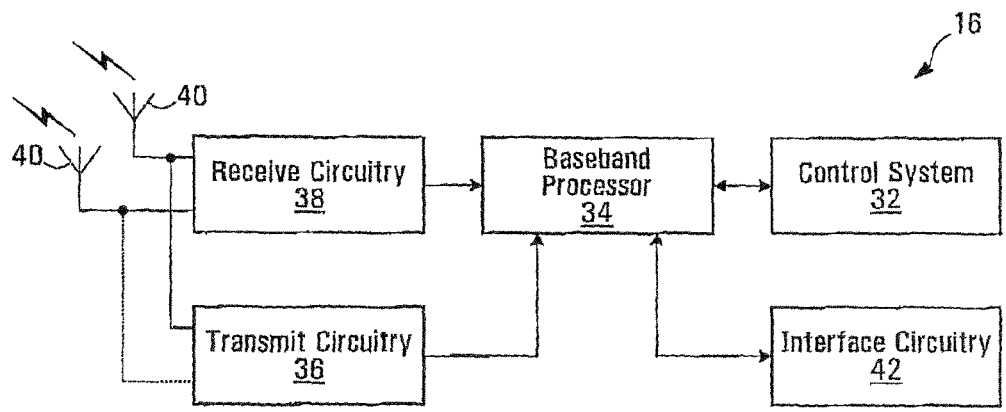
FIG. 3 is a block diagram of an example wireless terminal that might be used to implement some embodiments of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OEDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 4:
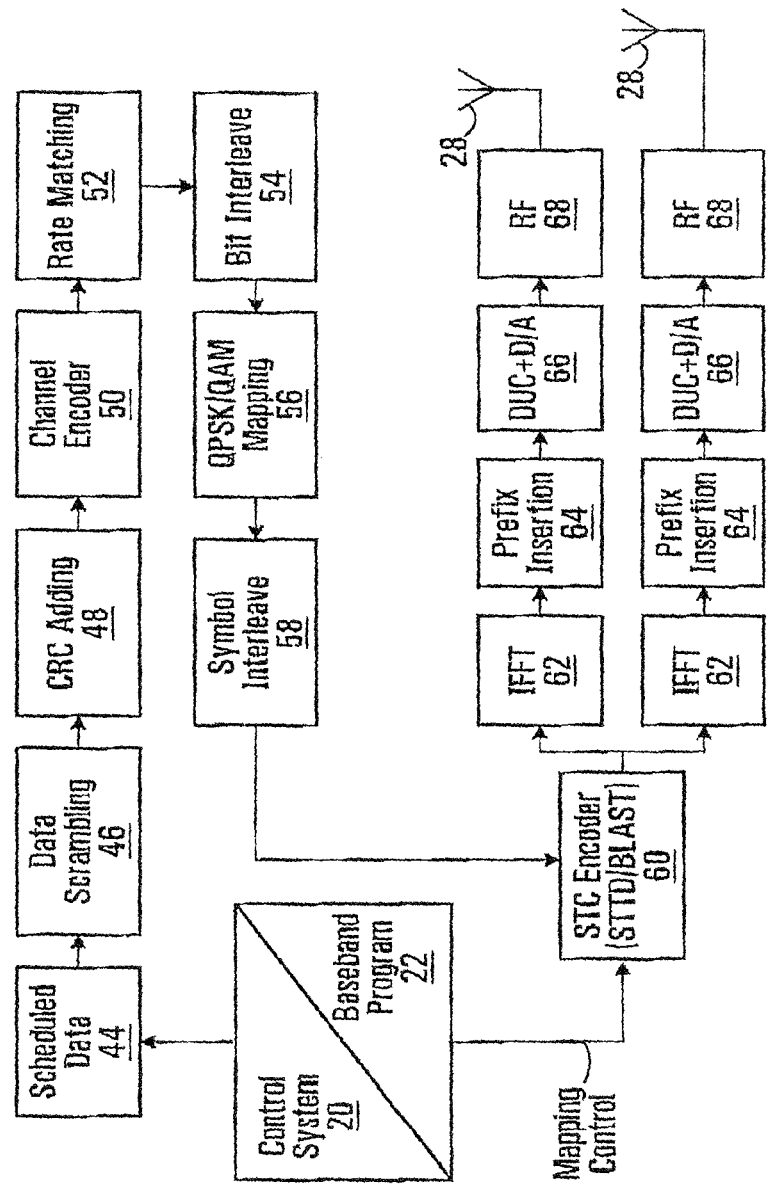
FIG. 4 is a block diagram of a logical breakdown of an example OFDM transmitter architecture that might be used to implement some embodiments of the present invention.

With reference to FIG. 4, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 2 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
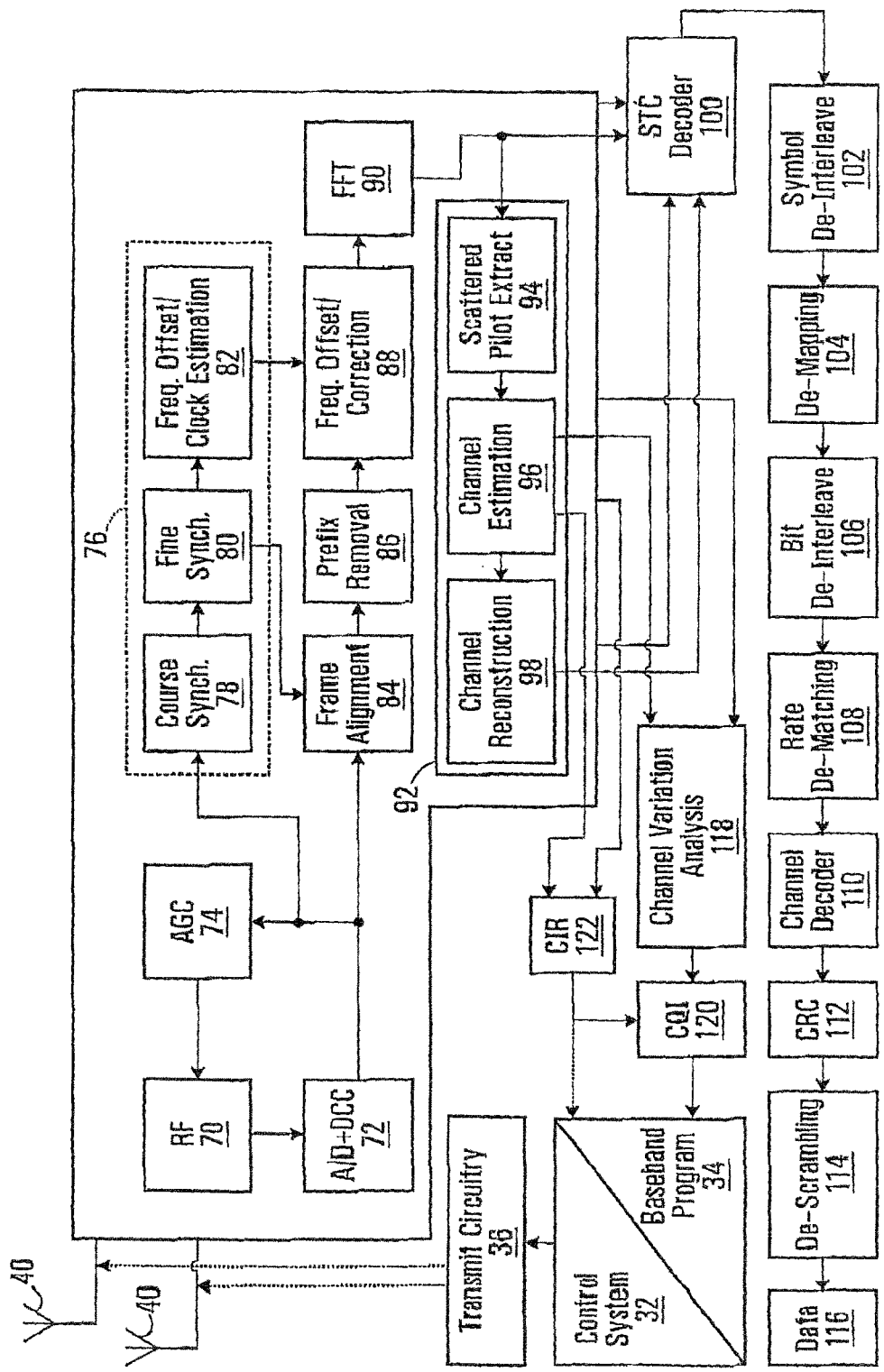
FIG. 5 is a block diagram of a logical breakdown of an example OFDM receiver architecture that might be used to implement some embodiments of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 15:
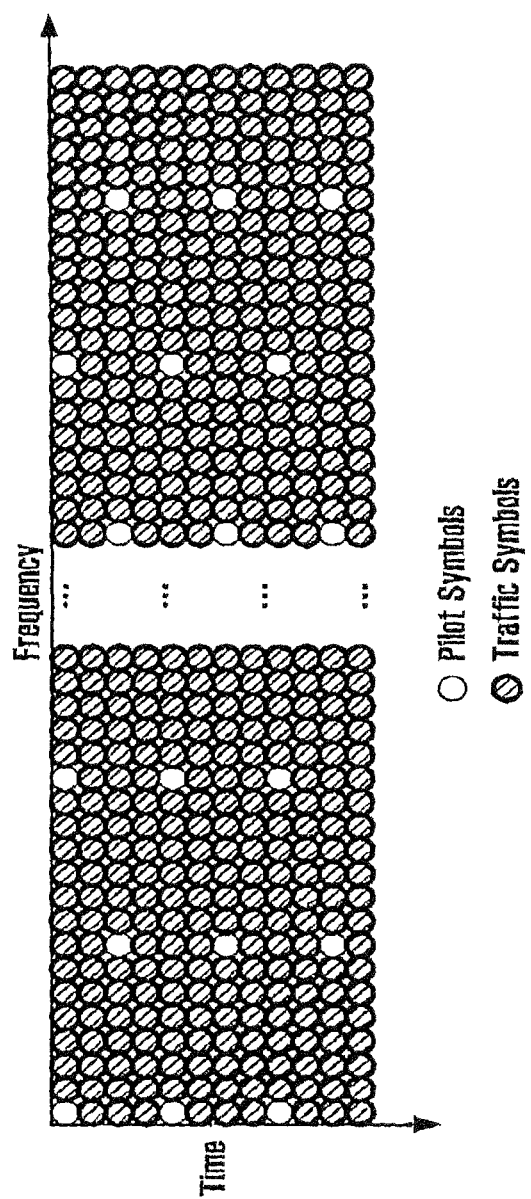
FIG. 15 is a diagram of a pilot pattern used in an OFDM environment.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 15 illustrates an exemplary scattering of pilot symbols among available sub-carriers over a given time and frequency plot in an OFDM environment. Continuing with FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 to 5 provide one specific example of a communication system that could be used to implement embodiments of the invention. It is to be understood that embodiments of the invention can be implemented with communications systems having architectures that are different than the specific example, but that operate in a manner consistent with the implementation of the embodiments as described herein.

The MAC (media access control) layer is used to enable features in the physical (PHY) layer in an OFDM air interface framework. Frames are a format used to transmit data over the air interface between base stations (BS) and wireless terminals. A wireless terminal is any OFDM capable wireless device and may be fixed location, nomadic or mobile, for example a cellular telephone, computer with a wireless modem, or PDA. Some types of information elements (IE) are included in the frame to provide a structure within the frame for defining where downlink and uplink information are located within the frame.

Figure 6:
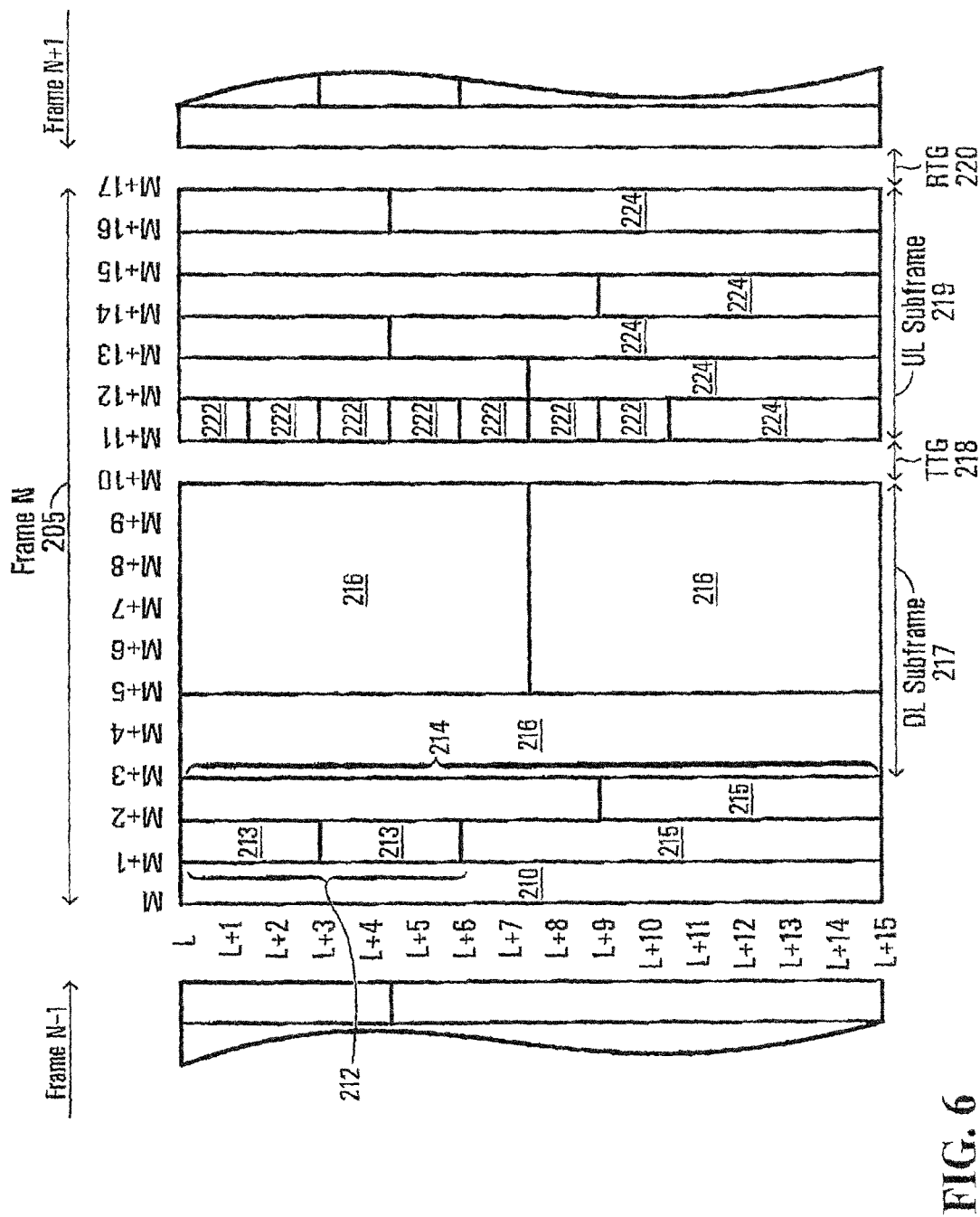
FIG. 6 is a schematic view of an OFDM frame for use with embodiments provided by the invention.

FIG. 6 shows a schematic diagram of an example frame used in conjunction with embodiments of the invention. Details are shown for a frame labelled "Frame N", generally indicated at 205, which is preceded by Frame "N−1" and followed by "Frame N+1", all forming part of an ongoing sequence of frames. The frame has a two dimensional appearance which is represented in terms of a rows and columns. The rows are designated by logical subchannel numbers L,L+1, . . . L+15 and the columns are designated by OFDM symbol numbers M,M+1, . . . M+15. Logical subchannels are designated groupings of active subcarriers. Active subcarriers are any one of data subcarriers for data transmission, pilot subcarriers for synchronization, or subcarriers that do not involve direct transmission, but are used as transition guards between parts of the frame. In the frame N of FIG. 6, a preamble 210 is included in a first OFDM symbol M. A second OFDM symbol M+1 and a third OFDM symbol M+2 include both a downlink (DL) mapping component 212 including one or more information elements 213 and an uplink (UL) mapping component 214 including one or more information elements 215. Other broadcast messages (not shown) may be included as well. Subsequent OFDM symbols M+3 through M+9 contain a DL subframe 217. The DL subframe 217 contains DL information allocated to regions 216 of the DL subframe 217 to be transmitted to one or more mobile terminals. Following the DL subframe 217 is a transmit/receive/transition guard (TTG) 218, shown during OFDM symbol period M+10. After the TTG 218 is a UL subframe 219 containing UL information allocated to designated regions 224 of the UL subframe to be transmitted back to the base station. The UL subframe 219 also includes fast feedback channels 222 that are used to allow the mobile terminal to report information to the base station. For example a fast feedback channel 222 can be designated as a channel to indicate the air interface channel quality between the base station and the mobile terminal. Following the UL subframe 219 is a receive/transmit transition guard (RTG) 220. Frames N−1 and N+1 have a similar composition.

Regions 216 of the DL subframe 217 contain MAC protocol data units (PDU). Regions 224 of the UL subframe 219 also contain MAC PDUs. MAC PDUs are known to include some or all of the following: a MAC header, MAC subheaders and a MAC payload.

The data frame of FIG. 6 is an example of a time division duplex (TDD) data frame. It is to be understood that embodiments of the invention are also applicable to frequency division duplex (FDD) operation.

The illustrated frame structure is a specific example. The preamble, mapping components, DL subframe and UL subframe may be implemented using an implementation specific number of OFDM symbols, with implementation specific guard bands. The number and definition of OFDM subchannels is also an implementation detail. The layout sequence of the various fields can also be varied.

Feedback Methodologies

In general, optimized downlink (DL) operations between the BS and the mobile terminal utilize feedback from the mobile terminal, commonly known to those skilled in the art and therefore referred to hereafter, as a "Mobile Subscriber Station" (MSS). While subscriber station denotes a device subscribing to a service, it is to be understood that the more general wireless terminal, to which embodiments of the invention apply, may not be a subscriber to any services and may not necessarily be mobile. Those types of feedback include DL channel quality indication (CQI) feedback, DL MIMO (multiple input multiple output) mode and permutation selection, physical channel report, etc. There are also other feedback related to the uplink (UL) operation, such as the MSS UL transmit power headroom.

In order to facilitate downlink data transmission, some information, such as C/I measurements (received signal power divided by the noise plus interference power) and MSS indications, such as MIMO permutation modes is transmitted from the MSS to the BS.

In the IEEE 802.16e standard a fast-feedback channel is introduced to enable such UL transmission. The fast feedback channel utilizes a dedicated CQI channel to transmit a limited amount of feedback information in addition to the CQIs. Two types of fast feedback operations are established in which:

1) a unicast Fast-Feedback allocation subheader is utilized to let the MSS feedback one of four types of information on a temporarily allocated fast-feedback channel; and 2) a broadcast channel allocation information element (IE) is utilized to allocate a dedicated feedback channel with periodic opportunity for enabling the MSS to provide the BS with an indication of its MIMO related feedback.

The two above-described approaches provide quasi-periodic opportunity to enable the MSS to provide its indication and feedback. Further description regarding these types of fast feedback operations is found in U.S. patent application Ser. No. 11/547,561 filed Oct. 5, 2006, now U.S. Pat. No. 7,630,356, which is assigned to the assignee of the present application and is incorporated herein by reference.

In some situations, if the MSS needs to inform its intention based on some real-time requirements and needs the BS to have a quick reaction (e.g., fast anchor BS switching, MIMO mode switching, UL resource request and etc), the above two approaches may not be efficient ways of performing this task, especially if the MSS has a dedicated feedback channel assigned for periodic reporting and the indication from the MSS is not expected to change very frequently so the period is set to a long duration.

In some embodiments of the present invention, it is assumed that each MSS has a dedicated feedback channel. An example of such a dedicated feedback channel is a channel quality indication channel (CQICH) which allows the MSS to provide feedback to the BS regarding the quality of the communication channel between the BS and MSS. The dedicated channel may for example, be allocated by a CQICH allocation information element (CQICH Alloc IE) as described in U.S. patent application Ser. No. 11/547,561 filed Oct. 5, 2006, now U.S. Pat. No. 7,630,356, or by channel allocation IEs described below.

In some embodiments, the dedicated feedback channel allocated by the BS allows for transmission of 4 bits of feedback information. An enhanced dedicated feedback channel allows for transmission of 6 bits. More generally, the number of bits transmitted by the feedback channel may be other than the 4 bits or 6 bits specifically mentioned above. However, preferably the number of bits is less than 10 bits.

Figure 7:
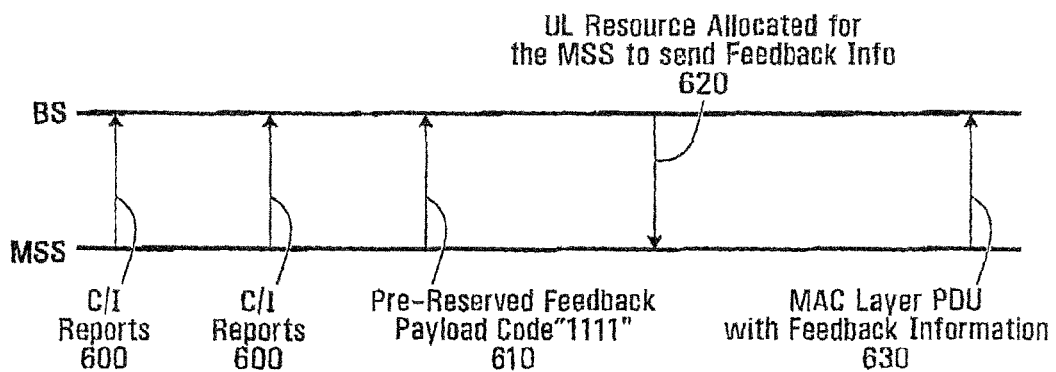
FIG. 7 is a signaling diagram for communication between a base station (BS) and a wireless terminal according to one embodiment of the invention.

A first embodiment of enabling feedback will now be described in relation to FIG. 7. In the particular embodiment described, the MSS sends periodic C/I reports to the BS at 600. The periodic reports are sent on the dedicated channel. At a subsequent point in time, indicated at 610, the MSS autonomously indicates to the BS its intention to send feedback information by transmitting a pre-reserved feedback payload code on the dedicated feedback channel, for example 1111, to the BS.

In response to this pre-reserved feedback payload code, the BS sends the MSS an information element (IE), indicated at 620, that allocates uplink resources for the MSS to send MSS feedback containing the feedback information. In some embodiments the IE may be a "MIMO UL Basic" IE as described in U.S. patent application Ser. No. 11/547,561 filed Oct. 5, 2006, now U.S. Pat. No. 7,630,356, used for allocating UL transmission resources. The BS sends the uplink resource allocation IE within a general uplink resource allocation mapping component portion of the data frame, such as mapping component 214 in FIG. 6. In some instances, the MSS feedback includes information such as basic connection identification (CID), feedback type and feedback content. The MSS then sends the MSS feedback information to the BS over the allocated uplink resource in a MAC PDU at 630. The MAC PDU allocated as an uplink resource is found in regions 224 of the UL subframe 219 in the data frame 205 of FIG. 6 as described above. The MSS sending the MSS feedback information 630 may occur in the same data frame as the uplink resource allocation IE is sent 620 or it may send the MSS feedback information in a subsequent data frame.

The MSS feedback information in the above signaling example is sent in the form of any one of a 1) feedback header, 2) a feedback mini-header or 3) a subheader in the MAC PDU, as will be described in more detail below. The feedback header and the feedback mini-header are particular examples of a more general MAC PDU header. The feedback header and feedback mini-header are portions of the MAC PDU that typically precede the MAC payload. In some embodiments, they contain information specific to the PDU related to the contents of the MAC PDU, for example a connection identifier (CID) for a communication link between the BS and a specific MSS. The feedback subheader is a particular example of a more general MAC PDU subheader. The feedback subheader is another component that may be included in a MAC PDU. A subheader is typically located between the MAC PDU header and the MAC PDU payload and can be used for transmission of information between the BS and the MSS The above-described embodiment can also be used as a preliminary step for the MSS to request additional uplink resources. In response to receiving the pre-reserved feedback payload code, the BS allocates an uplink resource of a particular size, for example 6 bytes. Instead of using the 6 bytes to transmit feedback information, the MSS may use the 6 byte allocation to transmit a request for a more appropriate sized UL transmit resource. One example of such a request is a Bandwidth Request header.

In some embodiments, the MSS sends the pre-reserved payload code whenever it has feedback information to send to the BS.

The pre-reserved payload code is any particular N-bit payload value that is established to be recognized as the indication that the MSS desires to send feedback information, where "N" is the number of bits used for transmission on the feedback channel.

When the feedback channel used is enabled for 4 bits, the pre-reserved payload bits are set and maintained in an uplink channel description (UCD) as a specific channel encoding value. Preferably the N-bit payload value is not to be all zeroes. Preferably, when the feedback channel is the enhanced fast feedback channel that is enabled for 6 bits, the pre-reserved code is 0b11110.

If the MSS supports the feedback method by using the pre-reserved N-bit payload code and a feedback header, a value "M" is defined as the pre-reserved N-bit payload code in the UCD. To avoid a situation where the pre-reserved payload code conflicts with a calculated CQI that is transmitted on the same channel as the pre-reserved payload code, if a calculated CQI payload value is found to be equal to the value "M" the MSS sets the CQI payload bits to a value equal to "M−1" instead of "M".

Figure 8:
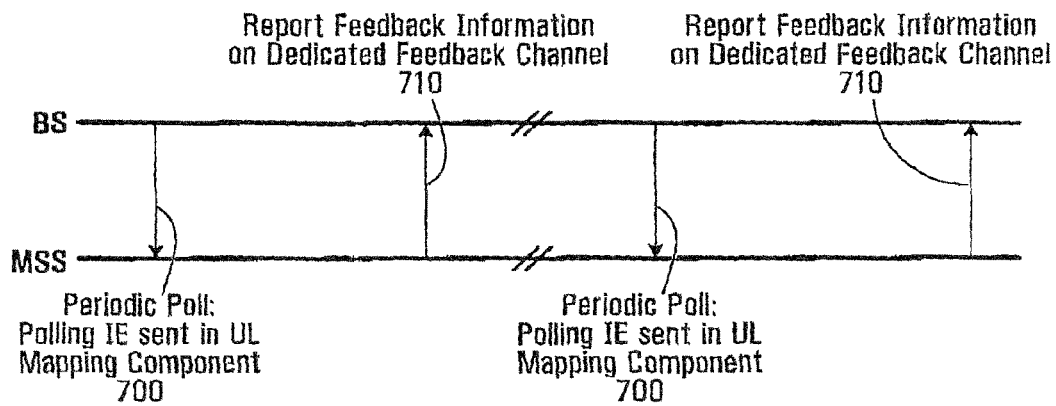
FIG. 8 is a signaling diagram for communication between a BS and a wireless terminal according to another embodiment of the invention.

In another embodiment also having a dedicated feedback channel, illustrated by way of example in FIG. 8, the BS uses an unsolicited polling method to indicate its request for feedback information. The polling method involves using an IE, such as the UL IE 215 in FIG. 6, sent by the IS to schedule MSS feedback information transmission by the MSS. An example of a particular IE is a "Feedback polling" IE that will be described in more detail below. The BS sends the polling IE at 700, which indicates the feedback type desired by the BS to the MSS within the more general uplink resource allocation mapping component portion of the data frame, such as mapping component 214 in FIG. 6. The MSS uses the dedicated feedback channel to report the desired feedback information in the next frame, indicated at 710. In some embodiments, the process of polling and reporting occurs as often as desired by the BS.

In some embodiments, the MSS does not have a dedicated feedback channel allocated for feedback transmission to the BS. Therefore, the BS allocates a temporary feedback channel to be used by the MSS for transmitting feedback information.

Figure 9:
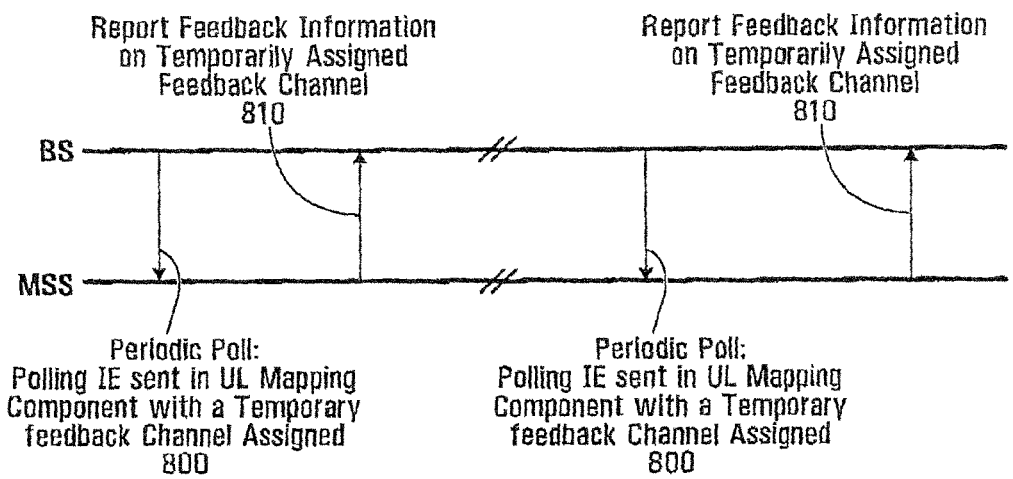
FIG. 9 is a signaling diagram for communication between a BS and a wireless terminal according to a further embodiment of the invention.

With reference to FIG. 9, in a first such embodiment with no dedicated feedback channel, the BS uses an unsolicited polling method by using an IE sent by the BS to schedule MSS feedback transmission by the MSS. Similar to the polling IE described above for the case where a dedicated channel does exist, the polling IE in this embodiment includes the desired feedback type for the MSS to report. In addition, the BS also allocates a temporary feedback channel in the data frame to be used for transmission of the MSS feedback. The BS transmits the polling IE, shown at 800, which indicates the feedback type expected by the BS as well as an identification of the temporarily allocated feedback channel. The MSS uses the temporarily allocated feedback channel to report the desired feedback information requested by the BS in the next frame, as indicated at 810. The polling IE used in this example is the "Feedback polling" IE, which will be described in more detail below.

In FIGS. 8 and 9, the MSS sending the MSS feedback information on the dedicated or temporarily allocated channel may occur in the same data frame as the polling IE is sent or it may send the MSS feedback information in a subsequent data frame.

In the examples of FIGS. 8 and 9, instead of transmitting a polling indication to the MSS using the polling IF, the BS may use a fast feedback subheader, as described in U.S. patent application Ser. No. 11/547,561 filed Oct. 5, 2006, now U.S. Pat. No. 7,630,356, to indicate the type of feedback requested by the BS and the location of the uplink resources (either a dedicated channel or a temporarily allocated channel) for the MSS to transmit the feedback requested by the BS.

Figure 10:
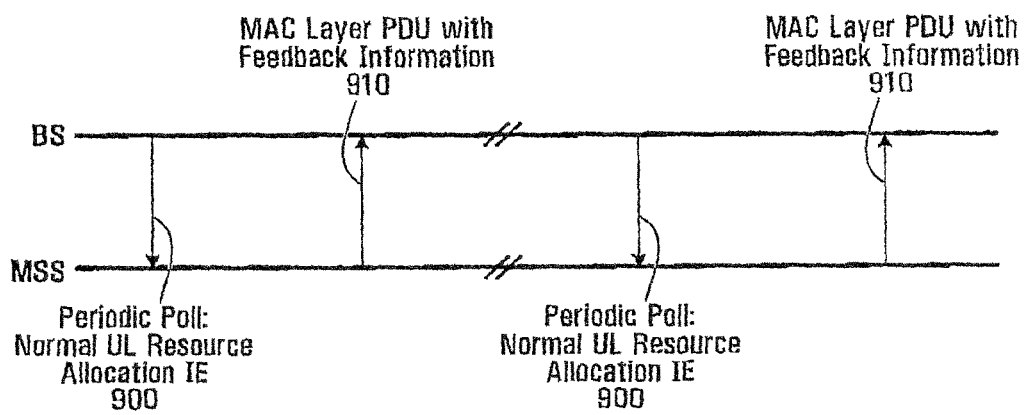
FIG. 10 is a signaling diagram for communication between a BS and a wireless terminal according to still a further embodiment of the invention.

With reference to FIG. 10, another embodiment in which there is no dedicated feedback channel will now be described. The BS uses another form of an unsolicited polling method to enable the MSS to send MSS feedback information. The BS uses an uplink resource allocation IE, for example the "MIMO UL Basic" IE described above, to allocate UL transmission resources for the MSS to transmit feedback information on as indicated at 900, instead of sending the polling IE as in the previously described embodiment. The BS sends the uplink resource allocation IE within a more general uplink resource allocation mapping component portion of the data frame. Allocating the UL transmission resources includes the IE transmitting a location of the UL transmission resources in the data frame. The MSS uses the UL resources allocated by the uplink resource allocation IE to transmit a MAC PDU containing the MSS feedback information to the BS as indicated at 910. The MSS sending the MSS feedback information 910 may occur in the same data frame as the uplink resource allocation IE is sent 900 or it may send the MSS feedback information in a subsequent data frame.

The MSS feedback information in the above signaling example is sent in the form of any one of a feedback header, a feedback mini-header or a sub-header in the MAC PDU, as will be described in more detail below.

One advantage of the above embodiments is to enable quick reaction based on a real-time requirement, such as fast anchor BS switching, fast MIMO mode switching or timely UL resource allocation for UL traffic.

"Feedback Polling" IE

The periodic polling from the BS in the form of an IE transmits to the MSS a number of allocations for a frame. For each allocation the BS indicates whether a dedicated channel is previously assigned or a feedback channel needs to be temporarily assigned. If the dedicated channel is previously assigned, the BS transmits an identification of the dedicated channel on which feedback is to be transmitted. If the feedback channel needs to be temporarily assigned, the BS identifies a location of a feedback channel to be used for transmitting feedback type and feedback content in an uplink portion of the frame. The BS then indicates the feedback type on the assigned feedback channel.

An example of syntax for the scheduling IE used for unsolicited polling of the MSS described above with respect to FIGS. 8 and 9 is shown in Table 1 identified as the "Feedback polling" IE. In some embodiments, the "Feedback polling" IE is designed so that it can be used whether or not there is a dedicated channel. The "Feedback polling" IF of Table 1 uses a "Feedback channel assigned indicator" field to indicate whether a feedback channel is already dedicated or a feedback channel needs to be temporarily allocated. How the "Feedback channel assigned indicator" field is set determines if the BS needs to allocate a temporary feedback channel or not. If a feedback channel needs to be temporarily allocated, then the "Feedback channel assigned indicator" field bit is set equal to "0", so that provision will be made for this action. If the feedback channel does not need to be temporarily allocated, then the "Feedback channel assigned indicator" field bit is set equal to "1", and the dedicated feedback channel is appropriately identified using the "channel quality indicator ID (CQICH ID)" field. Once the conditions for the feedback channel are established, the feedback type desired by the BS is set using the "Feedback type" field.

TABLE 1

Feedback polling IE format

| Syntax | Size in bits | Notes |
|---|---|---|
| Feedback polling IE( ) { | | |
|   Extended UIUC | 4 | Identifies type of IE |
|   Length | 4 | Length of the message in bytes |
|   Num Allocations | 4 | Number of allocations in this IE |
|   for (i = 0; i < Num Allocation poll; i++) { | | |
|     Feedback channel assigned indicator | 1 | 0: BS is polling a MSS who has no dedicated feedback channel assigned<br>1: BS is polling a MSS who has a dedicated feedback channel assigned |
|     if (feedback channel assigned indicator == 0 ) { | | |
|       CID | 16 | Basic ID of the polled MSS |
|       Feedback channel offset | 6 | Index to the fast feedback channel region marked by UIUC |
|     } | | |
|     else { | | |
|       CQICH ID | Variable | Assigned by using CQICH_alloc_IE |
|     } | | |
|     Feedback type | 4 | |
|   } | | |
| } | | |

The "Extended UIUC (uplink interval usage code)" field of Table 1 is used to associate a code value to identify a particular type of IE. For example, the "Feedback polling" IE in Table 1 might have "Extended UIUC"=06. Other IE have different respective Extended UIUC values. The value provided in Table 1 or values in subsequent tables below are mere examples of code values that could be used and it is to be understood that the code values assigned, and the number of bits used to represent the codes values could be varied according to a desired usage.

The values in the "Size" column of Table 1 refer to a number of bits used to represent the element of each respective field. It is to be understood that these values are but one example for each respective field. In some embodiments, the number of bits can be greater or less than what is represented in Table 1. For example, the number of bits in any of the fields may be desired to be less than the values represented above to reduce an overall IE size, and therefore reduces an overall overhead of the frame. Conversely, the number of bits in any of the fields may be greater than the values represented above at an acceptable cost of increasing the overall overhead of the frame.

Examples of feedback types used in the "Feedback type" field are found in Table 2. More generally, other types of feedback type and feedback content that are consistent with the intention of the invention as described herein, but not specifically included are to be considered within the scope of the present invention.

TABLE 2

Feedback Type and Feedback content

| Feedback Type | Feedback contents | Description |
|---|---|---|
| 0b0000 | MIMO feedback type (0b0000-0110 in Table 4 below) + feedback payload | MIMO mode and permutation Feedback |
| 0b0001 | DL average CQI (5 bits) | 5 bits CQI feedback |
| 0b0010 | Antenna index (2 bits) + MIMO coefficients (5 bits) | MIMO coefficients feedback |
| 0b0011 | Preferred-DIUC (4 bits) | Preferred DL channel DIUC feedback |
| 0b0100 | UL-TX-Power (7 bits) | UP transmission power |
| 0b0101 | Preferred DIUC(4 bits) + UL-TX-Power (7 bits) + UL-headroom (6 bits) | PHY channel feedback |
| 0b0110 | Number of groups, A (2 bits) + A occurrences of 'group index (2 bits) + CQI (5 bits)' | CQIs of antenna groups |
| 0b0111 | Number of bands, B (2 bits) + B occurrences of 'band index (6 bits) + CQI (5 bits)' | Multiple Band of CQI |
| 0b1000 | Number of feedback types, C (2 bits) + C occurrences of 'feedback type (4bits) + feedback content (variable)' | Multiple types of feedback |
| 0b1001-0b111 | Reserved | |

The binary values in the "Feedback type" column of Table 2 are associated with particular selectable options related to those fields. It is to be understood that each particular binary value is but one example for each particular option and a particular option can be represented by any appropriate binary value having any reasonable number of bits. More generally, other types of feedback type and feedback content that are consistent with the intention of the invention as described herein, but not specifically included are to be considered within the scope of the present invention.

Table 3a shows an alternative "Feedback polling" IE format to that shown in Table 1, in accordance with another embodiment of the invention.

TABLE 3a

Feedback polling IE format

| Syntax | Size in bits | Notes |
|---|---|---|
| Feedback polling IE( ){ | | |
| Extended UIUC | 4 | Identifies type of IE |
| Length | 4 | Length in bytes of following fields |
| for (i=0; i < Num Allocations; i++) | | |
| { | | |
| Basic CID | | |
| UIUC | | |
| Feedback type | 6 | |
| Allocation offset | 3 | The UL feedback shall be transmitted in the frame which is 0-8 frame delay relative to the current frame. |
| Duration | 10 | In OFDM slots |
| } | | |
| } | | |

In the "Feedback polling" IE of Table 3a, the "Allocation Offset" field indicates when the MSS is to transmit feedback information relative to the current frame.

Table 3b shows another alternative "Feedback polling" IE format to that shown in Table 1, in accordance with another embodiment of the invention.

TABLE 3b

Feedback polling IE format

| Syntax | Size in bits | Notes |
|---|---|---|
| Feedback polling IE( ) { | | |
| Extended UIUC | 4 | Identifies type of IE |
| Length | 8 | Length of the message in bytes |
| Num Allocations | 4 | Number of allocations in this IE |
| Dedicated UL Allocation Included | 1 | 0: No dedicated UL resource is allocated in feedback polling IE. BS should allocate UL resource through the UL map IE at each designated transmitting frame defined by this IE. 1: Dedicated UL resource is included in the IE |
| Reserved | 3 | Set to zero |
| for (i = 0; i < Num Allocations ; i++) { | | |
| Basic CID | 16 | Basic ID of the polled MSS |
| Allocation Duration (d) | | The allocation is valid for 10 × 2d frame starting from the frame defined by Frame offset If d = 0b000, the pre-scheduled Feedback header transmission is released If d = 0b111, the pre-scheduled Feedback header transmission shall be valid until the BS commands to release it |

TABLE 3b-continued

Feedback polling IE format

| Syntax | Size in bits | Notes |
|---|---|---|
| If (d !=000){ | | |
|   Feedback type | 4 | |
|   Frame offset | 6 | The offset (in units of frames) from the current frame in which the first feedback header shall be transmitted on the allocated UL resource. The start value of frame offset shall be 1 |
|   Period (p) | 2 | The UL resource region is dedicated to the MS in every $2^p$ frame |
|   If (Dedicated UL Allocation Included == 1){ | | |
|     UIUC | 4 | |
|     OFDMA symbol offset | 8 | |
|     Subchannel offset | 7 | |
|     Duration | 3 | In OFDMA slots |
|     Repetition coding indication | 2 | 0b00—No repetition coding<br>0b01—Repetition coding of 2 used<br>0b10—Repetition coding of 4 used<br>0b11—Repetition coding of 6 used |
|     } | | |
|   } | | |
| } | | |
| Padding bits | | |
| } | | |

Figure 11:
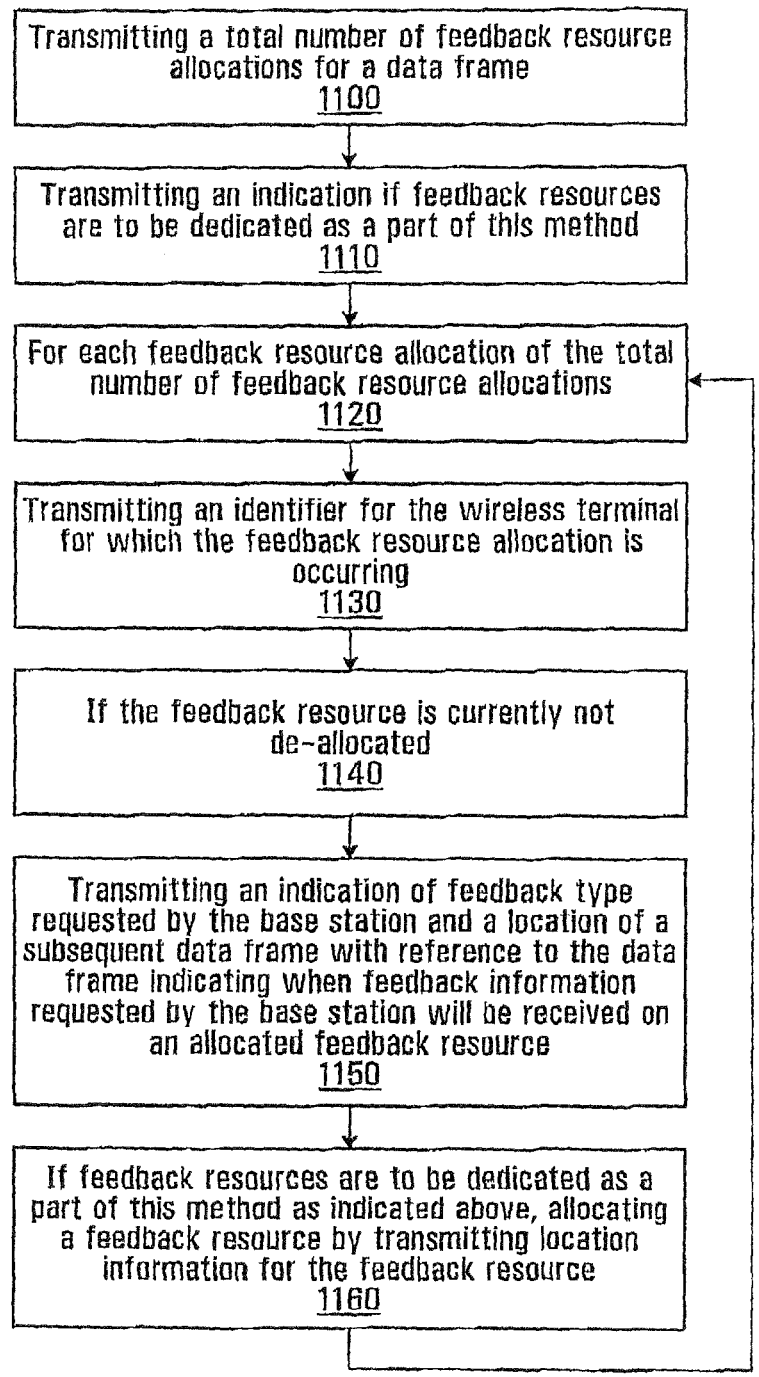
FIG. 11 is a flow chart for a method of a BS polling a wireless terminal in accordance with an embodiment of the invention.

Table 3b corresponds generally to a method described in the flow chart of FIG. 11. At step 1100, the base station transmits a total number of feedback resource allocations for a data frame. At step 1110 an indication if feedback resources are to be dedicated as a part of the method is also transmitted by the base station. As indicated at 1120 a looping function is initiated for each feedback resource allocation of the total number of feedback resource allocations. At step 1130, the base station transmits an identifier for the wireless terminal for which the feedback resource allocation is occurring. At step 1140, it is determined if the feedback resource is currently not released. If the feedback resource is currently not released, then at step 1150 the base station transmits an indication of feedback type requested by the base station and a location of a subsequent data frame with reference to the current data frame indicating when feedback information requested by the base station will be received on an allocated feedback resource. At step 1160, if feedback resources are to be dedicated as a part of the method according to step 1110, a feedback resource is allocated by transmitting location information for the feedback resource.

Feedback Header

One example of fast feedback currently known in wireless OFDM MIMO system is a DL FAST FEEDBACK subheader (described in more detail in U.S. patent application Ser. No. 11/547,561 filed Oct. 5, 2006, now U.S. Pat. No. 7,630,356) used by the BS to poll a MSS to provide up to four types of feedback on the fast feedback channel. To support MIMO channel related feedback, and feedback to support other aspects of UL operation, however, a greater number of feedback types are desired to be defined as well as an associated additional capacity for transmitting feedback content for these additional feedback types. A new polling signaling format is desired to be defined to accommodate more than the existing four types of feedback. In some embodiments of the present invention, including in particular the feedback header, the MSS is able to feedback a greater capacity of information at one time than the previously identified methods of performing feedback, such as using the DL FAST_FEEDBACK subheader.

The feedback header of the present invention sent by the MSS in response to an unsolicited polling IF from the BS has fields to identify it as a feedback header, identify the type of feedback and include feedback contents. Some examples of types of feedback and feedback contents are found in Tables 2 and 4.

TABLE 4

Encoding of payload bits for "MIMO feedback type"

| Value | Description |
|---|---|
| 0b0000 | STTD and PUSC/FUSC permutation |
| 0b0001 | STTD and adjacent-subcarrier permutation |
| 0b0010 | SM and PUSC/FUSC permutation |
| 0b0011 | SM and adjacent-subcarrier permutation |
| 0b0100 | Close-loop SM and PUSC/FUSC permutation |
| 0b0101 | Close-loop SM and adjacent subcarrier permutation |
| 0b0110 | Close-loop SM + beamforming and adjacent subcarrier permutation |
| 0b0111 | TEMP_BS_ID of expected anchor BS (TEMP_BS_ID was assigned in MOB_BSHO_REQ/RSP when the BS was added to the active set of a MSS) |
| Others | Reserved |

The binary values in the "Value" column of Table 4 are associated with particular selectable options related to those fields. It is to be understood that each particular binary value is but one example for each particular option and a particular option can be represented by any appropriate binary value having any reasonable number of bits. In addition, encoding of other types of feedback, not specifically described herein, can be assigned to the reserved bit values.

Figure 12:
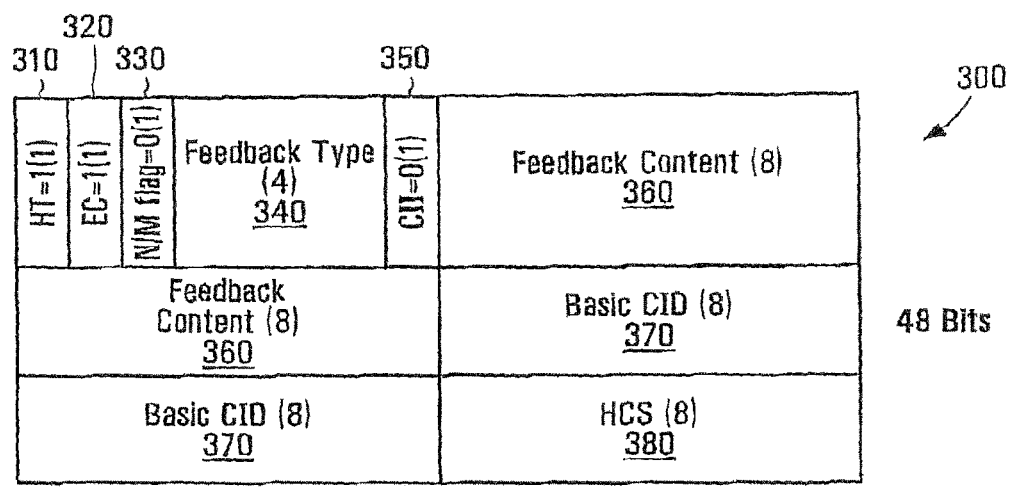
FIG. 12 is a block diagram of a feedback header in accordance with an embodiment of the invention.

An embodiment of a feedback header will now be described with respect to FIG. 12. FIG. 12 shows a portion of a feedback PDU (protocol data unit), the portion being a feedback header 300. The feedback PDU is located in regions 224 of the UL subframe 219 in data frame 205 of FIG. 6. The feedback header 300 includes a "Header Type (HT)" field 310, an "Encryption Control (EC)" field 320, a "Normal feedback header/Mini feedback header indication (N/M)" field 330 and a "CID Inclusion Indication (CII)" field 350. The remainder of the feedback header 300 includes a "Feedback Content" field 360, a "Basic connection identification (CID) field 370 and a "Header Check Sequence (HCS)" field 380.

An example of the feedback header 300 includes the following properties:

a) The length of the feedback header is 6 bytes (48 bits);

b) The "HT" field 310 is set equal to "1" and the "EC" field 320 is set equal to "1". This combination of bits is used to indicate that the header 300 is a feedback header;

c) The "N/M" field 330 as described below is set equal to "0" to indicate that this is a normal sized feedback header 300;

d) The "Feedback Type" field 340 is set according to the desired feedback type, for example the entries in Table 2 above;

e) The "CII" field 350 is set equal to "0" for the header with a CID field and set to 1 for the header without the CID field; and f) The "Feedback Content" field 360 is filled with feedback information to be supplied to the BS. For example, the feedback information may be based on the "Feedback Content" entries in Table 2 associated with a particular "Feedback Type".

In FIG. 12, the number that is in brackets in each field is a number of bits allocated to that field. For example, the number of bits in the "HT" filed is "1", the number of bits in the Feedback Type" field is "4" and the number of bits in the "Feedback content field is "8". In a preferred embodiment of the invention, the feedback header has 48 bits as shown. However, more generally, the number of bits is variable depending on the size of the feedback header desired. In some embodiments, the number of bits may still equal 48, but the distribution of bits may be allocated differently than shown. Furthermore, in some embodiments not all of the fields illustrated in FIG. 12 are included in the feedback header and the resulting header is still to be considered within the scope of the invention, for example there may be no "Basic CID" field 370.

In some situations, since the feedback header is sent using unicast UL resources assigned by the BS, the "Basic CID" field 370 in the feedback header 300 is redundant since the unicast UL resource uniquely identifies the MSS and will be sent by the MSS on a dedicated channel. Thus, the 16-bit "Basic CID" field 370 in the feedback header 300 can be removed and the bit space used for sending more feedback information.

Figure 13:
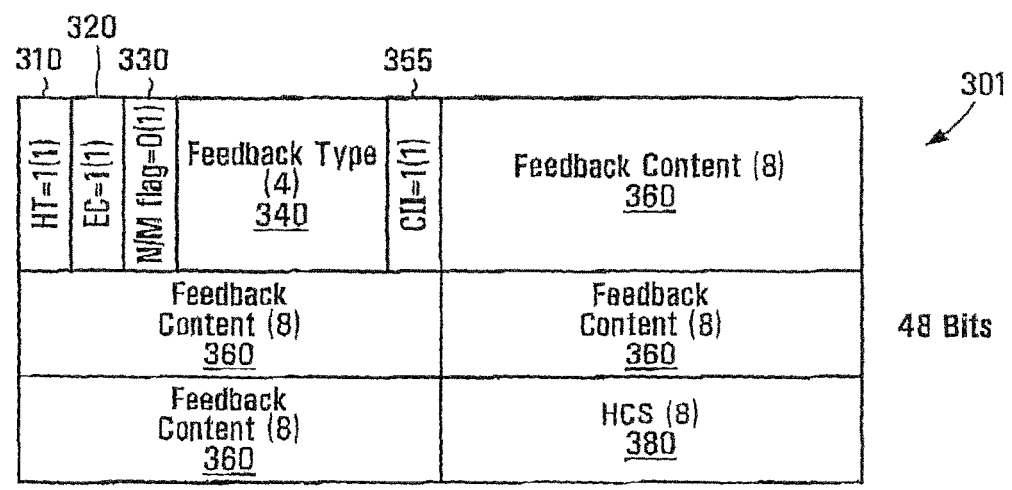
FIG. 13 is a block diagram of a feedback header in accordance with another embodiment of the invention.

In accordance with an embodiment of the invention, FIG. 13 shows the feedback header 301 without the "Basic CID" field 370. This allows more room for feedback content 360 to be transmitted. The other of the feedback header fields are the same as feedback PDU 300. Similarly to FIG. 12, the numbers that are in brackets in each field represent the number of bits allocated to the field.

In addition to using the feedback header in response to the feedback polling IE or the UL resource allocation mapping IE, the feedback header can be used in other scenarios when feedback information needs to be sent by a MSS. For example, the MSS can autonomously send the feedback header to the BS by sending a bandwidth request ranging code and then send the header after receiving a CDMA Allocation IE. In another example, a MSS can autonomously send the feedback header to the BS by sending the header along with UL traffic.

Feedback Mini-Header

Figure 14:
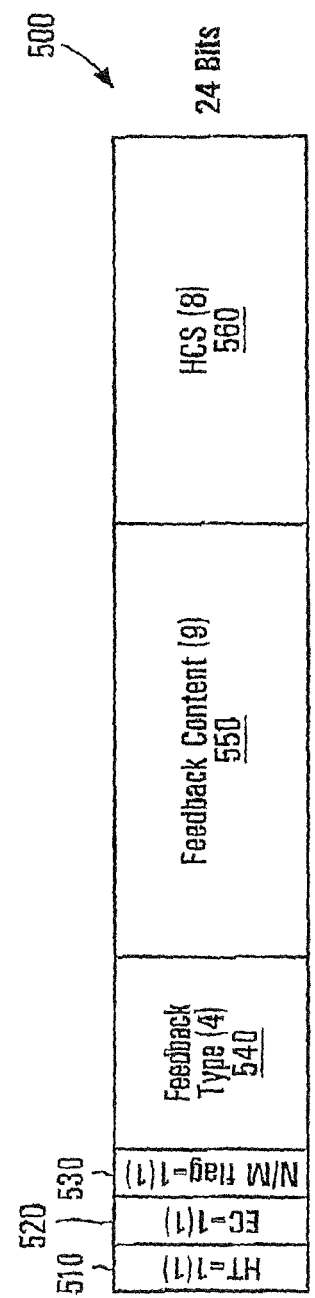
FIG. 14 is a block diagram of a feedback mini-header in accordance with an embodiment of the invention.

According to another embodiment of the invention there is provided a feedback header of reduced size. According to one embodiment of the invention this reduced size feedback PDU includes a feedback mini-header and does not contain a payload. A reduced size feedback header in accordance with an embodiment of the invention is shown in FIG. 14, generally indicated at 500. The reduced size feedback header 500 includes a "HT" field 510, a "EC" field 520, a "N/M type" field 530. The remainder of the reduced size header 500 includes a "Feedback Content" field 550, and a "HCS" field 560.

An example of the reduced size feedback header 500 has the following properties:

a) The length of the header 500 is 3 bytes (24 bits);

b) The "HT" field 510 is set to 1 and the "EC" field 520 is set to 1, the combination of which indicates that the header is a feedback header;

c) The "N/M" field 540 is set to 1 to indicate that this is a half-sized Feedback header;

d) The "Feedback Type" field 540 is set according to the desired feedback type, for example the entries in Table 2 above; and e) The "Feedback Content" 550 field is set accordingly, for example based on the entries in Table 2 in accordance with the selected value of the "Feedback Type" field.

When a MSS sends a feedback header on a unicast UT resource, the MSS may decide the size of the feedback header (i.e. normal feedback header or reduced sized feedback mini-header) based on the feedback type and the amount of information to feed back.

For the feedback header, MSS report IE and the feedback mini-header, other types of feedback type and feedback content that are consistent with the intention of the invention as described herein, but not specifically included in Table 2 and 4 are to be considered within the scope of the present invention. Furthermore, while the bit size of the "Feedback Type" and "Feedback Content" fields is described as 4 and 8 bits respectively, the number of bits in theses fields may be greater than or less than these numbers.

In a preferred embodiment of the invention, the feedback header has 24 bits as shown however, more generally, the number of bits is variable depending on the size of the feedback header desired. In some embodiments, the number of bits may still equal 24, but the distribution of bits may be allocated differently than shown.

Mini-Feedback Subheader

According to another embodiment of the invention the MSS can send feedback information to the BS in a mini-feedback subheader. Subheaders are part of a MAC PDU sent by the MSS to the BS that typically are located subsequent the header in the MAC feedback PDU. The subheader most often occurs between the header and the content or payload of the PDU, but it may be located elsewhere in the PDU. An example of the format of such a mini-feedback subheader is shown in Table 5.

TABLE 5

Mini-Feedback Subheader

| Name | Size in bits | Description |
| --- | --- | --- |
| Feedback Type | 4 | Type of feedback |
| Feedback Content | 12 | |

Examples of the "Feedback type" and "Feedback Content" fields are found in Tables 2 and 4. More generally, other types of feedback type and feedback content that are consistent with the intention of the invention as described herein, but not specifically included are to be considered within the scope of the present invention.

MIMO transmission format and signalling apparatus are generalized to allow a variety MIMO schemes to operate by using the same air-interface design. In some communications sessions basic transmission formats include: (1) spatial multiplexing (SM) and (2) space-time transmit diversity (STTD), with vector or matrix weighted full MIMO or sub-MIMO transmission based on 2, 3 and 4 transmit antennas configurations, for example.

The following schemes are also generalized to the multiple base station transmission.

Figure 16:
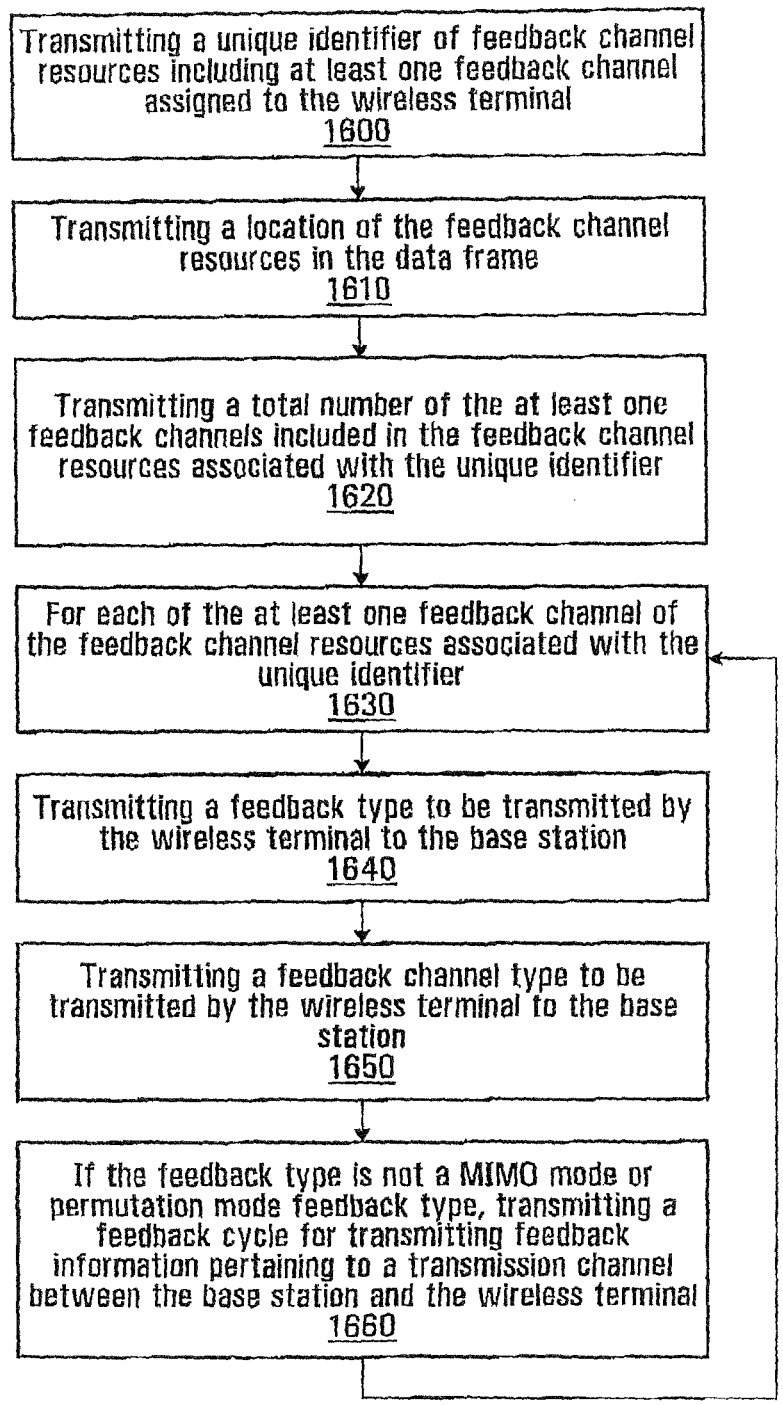
FIG. 16 is a flow chart for a method of a BS allocating uplink resources for closed-loop MIMO communication between the BS and a wireless terminal in accordance with an embodiment of the invention.

In order to utilize a feedback channel, the feedback channel must first be allocated. An embodiment of the invention will now be described with respect to FIG. 16. FIG. 16 illustrates a flow chart for a method of dynamically allocating at least one feedback channel to a wireless terminal in a MIMO-OFDM system. At step 1600, the base station transmits to the wireless terminal, in a data frame, a unique identifier of feedback channel resources including at least one feedback channel assigned to the wireless terminal. At step 1610, the base station transmits a location of the feedback channel resources in the data frame. At step 1620, the base station transmits a total number of the at least one feedback channels included in the feedback channel resources associated with the unique identifier. As indicated at 1630 a looping function is initiated for each of the at least one feedback channel of the feedback channel resources associated with the unique identifier. At step 1640, the base station also transmits to the wireless terminal a feedback type to be transmitted by the wireless terminal to the base station. At step 1650, a feedback channel type to be transmitted by the wireless terminal to the base station. At step 1660, if the feedback type is a MIMO mode or permutation mode feedback type, the base station also transmits a feedback cycle for transmitting feedback information pertaining to a transmission channel between the base station and the wireless terminal.

An illustrative example of an IE for allocating a feedback channel according to the method described above is shown below in Table 6. The feedback channel allocation IF has a field that identifies a unique index value for the feedback resource assigned to a particular MSS, a field that indicates how often the feedback is to be repeated, a field that indicates when the MSS is to start reporting feedback on a frame level basis, a field that indicates how long the feedback channel is to remain allocated to the MSS, a field that indicates how many feedback channels are assigned to each index value, for each feedback channel within a frame a field that indicates the type of feedback that is to be transmitted on the feedback channel, a field that allocates the location of that feedback channel for use by the MSS to transmit feedback, a field that indicates a CQICH type, and if the feedback type is a MIMO mode and permutation mode feedback type, a field that indicates a feedback cycle for transmission of MIMO mode and permutation mode feedback.

TABLE 6

CQICH Enhanced allocation IE format

| Syntax | Size in bits | Notes |
|---|---|---|
| CQICH Enhanced Alloc IE( ) { | | |
| Extended-2 UIUC | 4 | CQICH Enhance Alloc IE( ) = 0x00 (Identifies type of IE) |
| Length | 4 | Length in bytes of following fields |
| CQICH ID | variable | Index to uniquely identify the CQICH resource assigned to the MSS |
| Period (=p) | 2 | A CQI feedback is transmitted on the CQICH every 2^p frames |
| Frame offset | 3 | The MSS starts reporting at the frame of which the number has the same 3 LSB as the specified frame offset. If the current frame is specified, the MSS should start reporting in 8 frames |
| Duration (=d) | 3 | A CQI feedback is transmitted on the CQI channels indexed by the CQICH ID for 10 × 2^d frames. If d == 0b000, the CQICH is de-allocated. If d == 0b111, the MSS should report until the BS command for the MSS to stop. |
| CQICH Num | 2 | Number of CQICHs assigned to this CQICH ID is (CQICH Num + 1) |
| for (i=0; i < CQICH Num+1; i++) { | | |
| Feedback type | 4 | 0b000-0b010 = Fast DL measurement/Default Feedback depending on CQICH types<br>0b011 = Quantized precoding weight feedback<br>0b100 = Index to precoding matrix in codebook<br>0b101 = Channel Matrix Information<br>0b111 = MIMO mode and permutation mode feedback<br>0b110 = Reserved |
| Allocation index} | 6 | Index to the fast feedback channel region marked by UIUC = 0 |
| CQICH Type | 3 | 0b000 = 6-bit CQI,<br>0b001 = DIUC-CQI,<br>0b010 = 3-bit<br>0b011 = 4-bit<br>0b100 = 5<br>0b101-0b111 = reserved<br>A DIUC-CQI is a CQI channel that uses a modulation and coding level derived from the DIUC. |
| if (Feedback type == 0b111) {<br>MIMO permutation feedback cycle} | | 00 = No MIMO and permutation mode feedback<br>01 = the MIMO and permutation mode indication shall be transmitted on the CQICH indexed by the CQICH ID every 4 frames. The first indication is sent on the 8th CQICH frame.<br>10 = the MIMO mode and permutation mode indication shall be transmitted on the CQICH indexed by the CQICH_ID every 8 frames. The first indication is sent on the 8th CQICH frame.<br>11 = the MIMO mode and permutation mode indication shall be transmitted on the CQICH indexed by the CQICH ID every 16 frames. The first indication is sent on the 16th CQICH frame. |
| Padding<br>} | variable | The padding bits are used to ensure the IE size is integer number of bytes. |

The "CQICH ID" field uniquely identifies a fast feedback channel on which a MSS can transmit fast feedback information. With this allocation, a one-to-one relationship is established between the CQICH ID and the MSS.

The "Feedback type" field specifies the types of the feedback information on CQICH.

The "MIMO permutation feedback cycle" field specifies the MIMO and permutation mode fast feedback cycle.

Table 7 provide a list of example encodings of payload bits for use in transmitting feedback information from the MSS to the BS. Some of the encoding values are 4 bits for use on the standard 4 bit fast feedback channel and some of the encoding values are 6 bits for use on the enhanced 6 bit fast feedback channel.

TABLE 7

Example encoding of payload bits for Fast-feedback slot

| Value | Description |
|---|---|
| 0b0000 | STTD and PUSC/FUSC permutation |
| 0b0001 | STTD and adjacent-subcarrier permutation |
| 0b0010 | SM and PUSC/FUSC permutation |
| 0b0011 | SM and adjacent-subcarrier permutation |
| 0b0100 | Hybrid and PUSC/FUSC permutation |
| 0b0101 | Hybrid and adjacent-subcarrier permutation |
| 101110-110110 | Depending on if antenna grouping, antenna selection or a reduced precoding matrix code book is used. |
| 110111 | Closed loop precoding with 1 stream. |
| 111000 | Closed loop precoding with 2 streams. |
| 111001 | Closed loop precoding with 3 streams. |
| 111010 | Closed loop precoding with 4 streams. |
| 111011-111111 | Reserved |

In some situations of OFDM Closed-Loop (CL) MIMO communication between the base station and the wireless terminal or MSS as described above, the terminal feeds back information to the base station that allows the base station to provide the optimum signal to be received by the terminal. In some aspects of OFDM CL MIMO communication, a mathematical processing method commonly known as Singular Value Decomposition (SVD) is used by the MSS to determine optimal conditions for transmission by the BS to the MSS and feeds back this information to the BS to use appropriately in encoding the information to be transmitted by the BS. In some aspects of OFDM MIMO communication, the terminal can select a subset of BS antennas from a full group of BS antennas for transmission of downlink information to the MSS based on basic criteria measurable by the terminal, for example channel power strength between the BS and MSS. These aspects are more fully described in International Patent Application No. WO 2005/125044A1, which is assigned to the assignee of the present application, and is hereby incorporated by reference. In both of these above-mentioned aspects at least one feedback channel is used to allow the MSS to communicate desired information with the BS.

STTD/SM FFD Feedback Options

For STTD/SM mode communication with Frequency Division Duplexing (FDD) there are at least three MIMO modes for which feedback is used. For a Diversity Permutation mode the terminal transmits feedback related to STTD/SM mode selection and Average CQI. For an AMC Band Permutation mode the terminal transmits feedback related to STTD/SM mode selection and CQI of top X band (layer index+band index+CQI). For an Antenna Grouping Based mode, for both diversity and AMC band permutation the MSS transmits feedback related to Group index and CQI.

In some embodiments, feedback for the STTD/SM modes is provided by the feedback methods described above.

SVD FDD Feedback Options

When using SVD mode processing there are at least five modes for which some form of feedback is used. A first mode relates to Close loop and AMC band permutation. A second mode relates to H matrix that involves differential encoding. A third mode relates to W vector that involves differential encoding. A fourth mode relates to V and CQI of top X layers that involves differential encoding. A fifth mode relates to Code bock index of V and top X layers that involves differential encoding. Other modes are described in International Patent Application No WO 2005/125044A1.

There are multiple embodiments for providing feedback from the MSS to the BS for SVD modes. In one such embodiment, one or more dedicated fast feedback channels are assigned, for example one or more CQICHs, to provide MIMO channel feedback. In this embodiment an appropriate IE is used by the BS to send allocation information to the MSS identifying when the MSS is to send feedback information.

Figure 17:
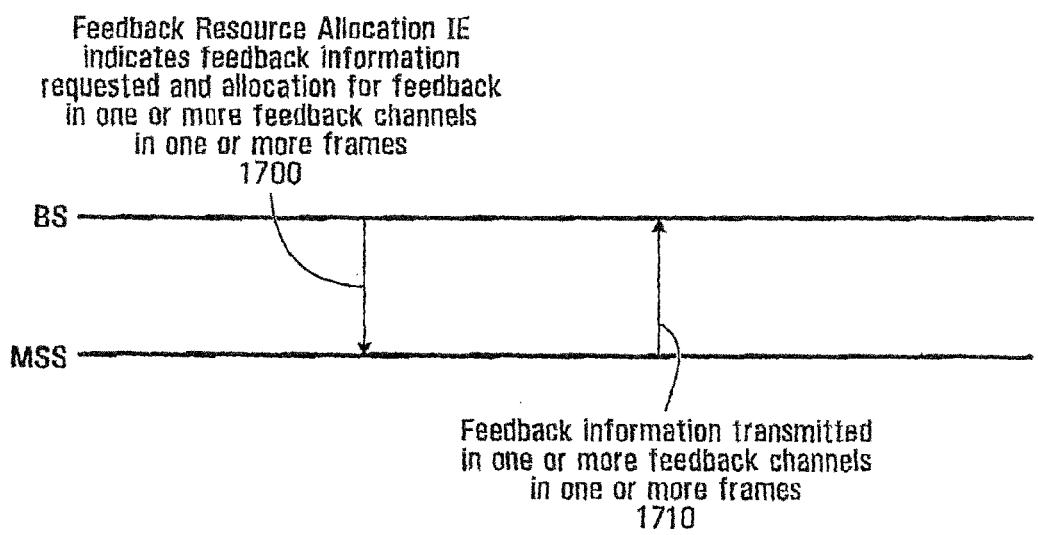
FIG. 17 is a signaling diagram for closed-loop MIMO communication between a BS and a wireless terminal according to an embodiment of the invention.

With reference to FIG. 17, such a scenario will now be described. At a first point in time, indicated at 1700 the BS sends an feedback resource allocation IE that indicates a total number of feedback channels to be allocated over one or more frames to allow the MSS sufficient capacity to transmit feedback requested by the BS. The feedback resource allocation IE also provides the MSS with an indication of the form of the feedback being requested by transmitting an indication of the how the feedback is to be transmitted by the MSS. For example whether STTD or BLAST, the average CQI, the layer index and the H, W or V matrix depending on the antenna configuration. At a subsequent point in time, indicated at 1710, the MSS transmits the requested feedback to the BS using the selected number of feedback channels. Although not specifically shown in FIG. 17, the MSS may transmit the feedback information requested by the BS in multiple frames as described below, in which case there would be multiple instances of 1710.

In some embodiments, the BS allocates uplink resources depending on the urgency that the BS requires the feedback information from the wireless device. If there is a high urgency, the BS may designate multiple feedback channels in a single frame so as to obtain all the feedback information as soon as possible. If there is a lower urgency, the BS may designate one or more feedback channels in multiple frames, either consecutive frames or frames having a designated periodicity.

The feedback channels may be represented by fast feedback channels 222 in FIG. 6. If more than one feedback channel is used, the MSS uses the feedback channels as a single uplink resource to send the feedback information to the BSS. For example if the feedback information requires 15 bits and four 4 bit feedback channels are allocated in a single frame, the MSS sends the 15 bits together in the single frame on the 16 bits comprising the four feedback channels. If the feedback information requires 15 bits and four 4 bit feedback channels are allocated in two consecutive frames, the MSS sends a first 8 bits of the 15 bits together on 8 bits comprising two feedback channels in the first frame and the remaining 7 bits of the 15 bits on the 8 bits comprising two feedback channels in the second frame. When the number of bits of feedback information does not fill an integer number of allocated feedback channels, the remaining bits not required may or may not be used for subsequent transmission of feedback information by the MSS.

The above-described situations are but examples of how feedback channels may be allocated in one or more frames. It is to be understood that any reasonable number of feedback channels could be allocated in any number of frames according to embodiments of the invention and still be within the scope of the invention.

Figure 18:
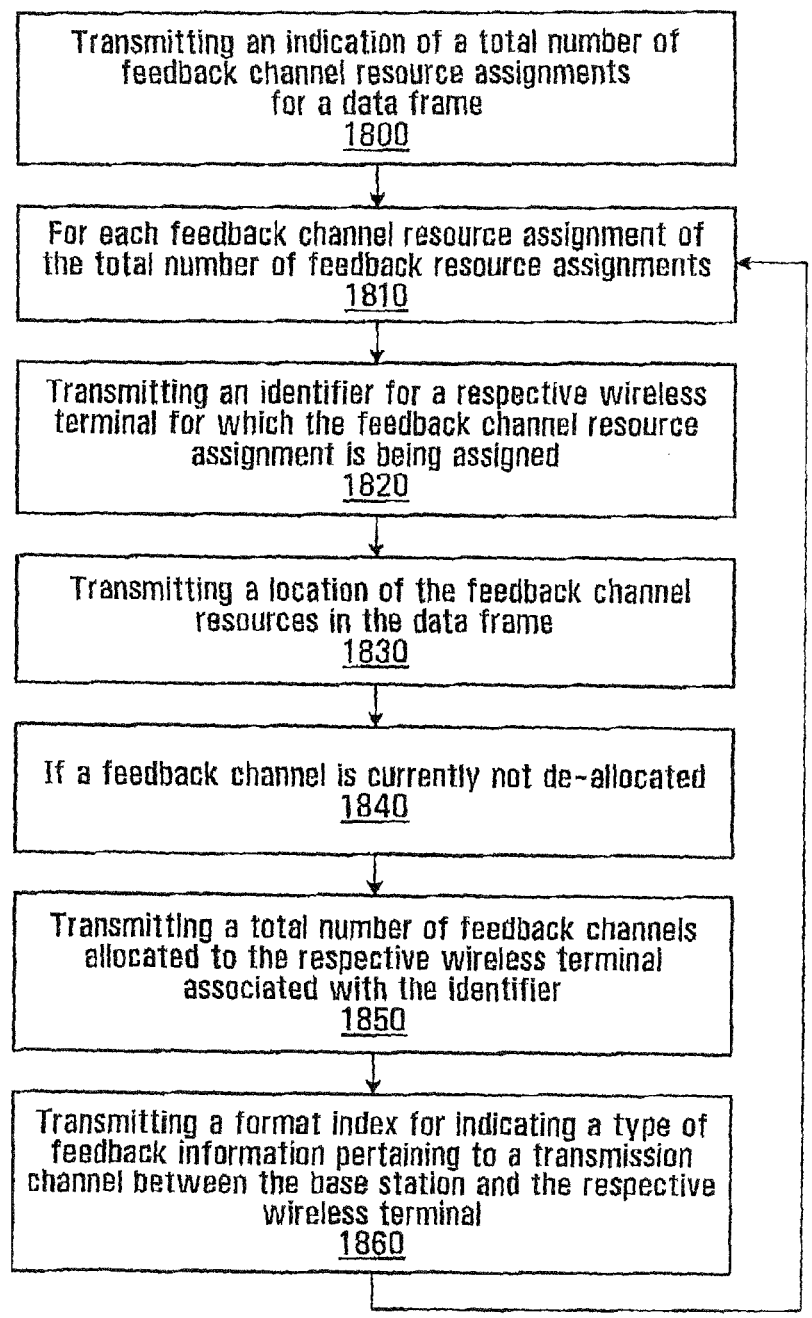
FIG. 18 is a flow chart for a method of a BS allocating uplink resources for closed-loop MIMO communication between the BS and a wireless terminal in accordance with an embodiment of the invention.

An embodiment of the invention will now be described with respect to FIG. 18. FIG. 18 is a flow chart for a method of dynamically allocating at least one feedback channel to a wireless terminal in a MIMO-OFDM system. At step 1800, the base station transmits to at least one wireless terminal an indication of a total number of feedback channel resource assignments, one per respective MSS as desired, for a data frame. As indicated at 1810 a looping function is initiated for each feedback channel resource assignment of the total number of feedback resource assignments. At step 1820 the base station transmits a unique identifier associated with a respective wireless terminal for which the feedback channel resource assignment is being assigned and at step 1830 a location of the feedback channel resources in the data frame. At step 1840, it is determined if the feedback channel is currently not de-allocated. If the feedback resource is currently not de-allocated, then at step 1850, the base station transmits a total number of feedback channels allocated to the respective wireless terminal associated with the identifier, and at step 1860, a format index for indicating a type of feedback information pertaining to a transmission channel between the base station and the respective wireless terminal.

An example of a feedback channel IE is shown in Table 8. This IE is used by the BS to assign one or more fast feedback channels to the MSS for the MSS to provide MIMO feedback. The feedback channel allocation IE has a field that identifies a number of feedback channel assignments or allocations to be made by the IE, a field that for each assignment sets an index value for the feedback channel assigned to the MSS, a field that sets how long the feedback channel is to remain allocated to the MSS, a field that sets when the MSS is to start reporting feedback on a frame level basis, a field that sets how often the feedback is to be repeated, if the feedback channel is not allocated, a field that sets a number of feedback channels allocated to the MSS identified by the MSS basic CID, a field that sets the number of feedback values formatted based on the "Format index" field that set the type of feedback is to be transmitted on the feedback channel, a field that sets the indication of the length of AMC band index, and a field that sets the indication of the length of CQI value index and sets the format index. The format index is an indication of a particular format to be used in transmitting feedback information from the MSS to the BS.

TABLE 8

MIMO CQICH Alloc IE

| Syntax | Size in bits | Notes |
| --- | --- | --- |
| MIMO CQICH Alloc IE ( ) { | | |
| Extended UIUC | 4 | Identifies type of IE |
| Length | 4 | Length in bytes of following fields |
| Num Assignments | 5 | Number of assignments in this IE |

TABLE 8-continued

MIMO CQICH Alloc IE

| Syntax | Size in bits | Notes |
| --- | --- | --- |
| For (i=0; i < Num Assignments; i++) { | | |
| CID | 16 | MSS basic CID |
| Duration(d) | 3 | The CQICH is assigned to a MSS for 10 × $2^d$ frames; If d = 0b000, the CQICH is deallocated; If d = 0b111, the MSS shall report feedback information using the assigned resource until the BS commands for the MSS to stop |
| Frame offset | 3 | The MSS starts to provide MIMO feedback at the frame number which has the same 3LSB as the specified frame offset. If the current frame is specified, the MSS shall start transmit feedback in 8 frames. |
| If (d !=0b000) { | | |
| Num CQICH Allocation | 4 | Number of CQICHs allocated to the MSS identified by the MSS basic CID |
| Num MIMO feedback | 3 | Number of feedback values formatted based on the "Format index" field defined below |
| Length of band index | 3 | Indication of the length of AMC band index |
| Length of CQI value index | 2 | Indication of the length of CQI value index 0b00: 4 bits 0b01: 5 bits 0b10: 6 bits 0b11: reserved |
| Format Index | 3 | See Table 9 below |
| } } } | | |

Table 9 includes a list of example feedback formats that could be used in the "Format Index" field of Table 8.

TABLE 9

MIMO feedback formats

| Format index | Feedback contents |
| --- | --- |
| 1. (STTD/BLAST diversity permutation) | STTD/BLAST selection (1 bit) + Average CQI (the number of bits = length of CQI value index indicated in the corresponding MIMO CQICH Alloc IE, e.g., 4/5/6 bits) |
| 2. STTD/BLAST antenna permutation | STTD/BLAST selection (1 bit) + Antenna group index (2 bits) + average CQI (the number of bits = length of CQI value index indicated in the corresponding MIMO CQICH Alloc IE, e.g., 4/5/6 bits) |
| 3. STTD/BLAST for AMC band permutation | Layer index (2 bits) + AMC band index (number of bits = Length of band index indicated in the corresponding MIMO CQICH Alloc IE) + CQI (the number of bits = length of CQI value index indicated in the corresponding MIMO CQICH Alloc IE, e.g., 4/5/6 bits) |
| 4. Feedback Channel H for AMC band permutation) | Layer index (2 bits) + H (xx bits-depending on antenna configuration) |
| 5. Feedback transmission weights for AMC band permutation | Layer index (2 bits) + W (xx bits-depending on antenna configuration + CQI (the number of bits = length of CQI value index indicated in the corresponding MIMO CQICH Alloc IE, e.g.. 4/5/6 bits) |

TABLE 9-continued

MIMO feedback formats

| Format index | Feedback contents |
|---|---|
| 6. Feedback V matrix for AMC band and permutation | Layer index (2 bits) + V (xx bits-depending on antenna configuration) + CQI (the number of bits = length of CQI value index indicated in the corresponding MIMO CQICH Alloc IE, e.g., 4/5/6 bits) |

The number of bits in the "Feedback contents" column of Table 9 are examples for each associated "Format Index" and it is to be understood that the number of bits to represent the "Feedback contents" may be more or less than those shown in Table 9. More generally, other types of feedback type and feedback content that are consistent with the intention of the invention as described herein, but not specifically included are to be considered within the scope of the present invention.

After the MSS receives such an IE, the MSS may continuously transmit the information defined in Table 8 during the assignment duration or until the feedback channels are deallocated. In some embodiments, the information bits are mapped to the assigned feedback channels in the following manner. For the first frame where feedback channels is allocated, the payload of the first CQICH is first filled and the payload of second feedback channel is then filled. This continues until all assigned feedback channels in the frame are filled up. This process is repeated for each subsequent frame.

Table 10 illustrates an example of a format used at 1710 in FIG. 17 by the MSS to transmit the feedback information to the BS after receiving the contents of the "MIMO CQICH Alloc" IE.

TABLE 10

MIMO feedback

| Syntax | Size in bits | Notes |
|---|---|---|
| for (i=0; i < Num MIMO feedback; i++) | | If the Num MIMO feedback >1, the feedback, either layer based or AMC band based, shall be in the order so that the layer or AMC band who has the maximum CQI appears first. |
| { | | |
| Feedback content formatted as indicated by format index | 3 | See "Feedback Content" in Table 9. |
| } | | |
| If (Format index == 4) | | |
| Average interference | 4 | Average interference |
| If (Format index == 3) | | |
| STTD/BLAST Selection | 1 | 0b0: STTD is selected 0b1: BLAST is selected |

Figure 19:
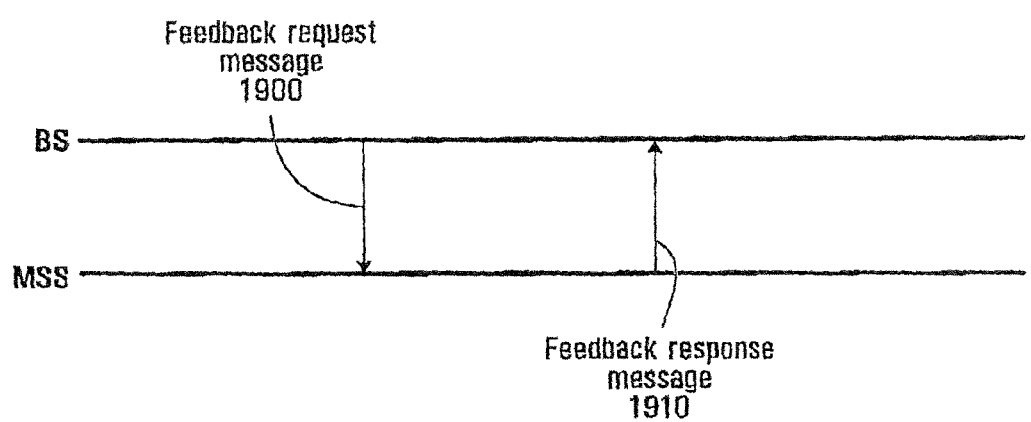
FIG. 19 is a signaling diagram for closed-loop MIMO communication between a BS and a wireless terminal according to another embodiment of the invention.

Another embodiment for providing feedback from the MSS to the BS for SVD modes will now be further described with respect to FIG. 19. At a point in time, indicated at 1900, the BS polls the MSS for desired feedback with a feedback request message. At 1910, in response to the feedback request message the MSS transmits a feedback response message containing the feedback information requested by the BS.

Table 11 illustrates an example of a structure for a "MIMO Feedback Request" message. This message may be used by the BS to request MIMO feedback information from the MSS that supports MIMO operation.

TABLE 11

MIMO Feedback Request message format

| Syntax | Size in bits | Notes |
|---|---|---|
| MIMO Feedback Request message format ( ) { | | |
| Num MIMO feedback | 3 | Number of feedback values formatted based on the Format index defined below |
| Length of band index | 3 | Indication of the length of AMC band index |
| Length of CQI value index | 3 | Indication of the length of CQI value index |
| Format Index | 3 | See Table 9 |
| } | | |

Table 11 is an example of fields that may be included in the feedback request message. The fields in the feedback request message are included to reflect the feedback information requested by the BS. It is to be understood that additional fields or fewer fields associated with the feedback process may be used in requesting feedback information depending on the type of feedback that is being requested.

Table 12 illustrates an example of a structure for a "MIMO Feedback Response" message. This message may be used by the MSS to supply MIMO feedback information to the BS as a reply after receiving a "MIMO Feedback Request" message or as an unsolicited MIMO feedback message.

TABLE 12

MIMO Feedback Response message format

| Syntax | Size in bits | Notes |
|---|---|---|
| MIMO Feedback Response message format ( ){ | | |
| Num MIMO feedback | 3 | Number of feedback values formatted based on the Format index defined below |
| Format index for ( i=0: i < Num MIMO feedback: i++) | 3 | If the Num MIMO feedback >1, the feedback, either layer based or AMC band based, shall be in the order so that the layer or AMC band who has the maximum COJ appears first. |
| { | | |
| Feedback content formatted as indicated by format index | 3 | See "Feedback Content" in Table 9. |
| If (Format index == 4) | | |
| Average interference | 4 | Average interference |
| If (Format index == 3) | | |
| STTD/BLAST Selection | 1 | 0b0: STTD selected 0b1: BLAST selected |
| } | | |

Table 12 is an example of fields that may be included in the feedback response message. The fields in the feedback response message are included to reflect the feedback information transmitted by the MSS. It is to be understood that additional fields or fewer fields associated with the feedback process may be used in providing feedback information depending on the type of feedback that is requested.

A further embodiment for providing feedback from the MSS to the BS for SVD modes is an autonomous MIMO feedback message sent by the MSS. In this case the MSS, without being solicited for a response, sends a message to the BS containing feedback information. The message sent by the MSS may be similar in structure to the "MIMO Feedback Response" message format.

The examples of the format for the "MIMO feedback" used in response to the "MIMO CQICH allocation" IE and the request and response messages described above in Tables 10, 11 and 12 are but a single example of each format. It is to be understood that the "MIMO feedback" format and the request and response messages may contain additional of fewer fields for requesting or reporting feedback, and are still within the scope of the present invention if used for requesting or reporting feedback between the MSS and the BS Yet another embodiment for providing feedback from the MSS to the BS for SVD modes is by using a MAC feedback header using methods similar to those described above in FIGS. 7 and 10.

The feedback headers of FIG. 11 or 12 are examples of a feedback header that may be used by the MSS to provide closed-loop MIMO feedback information. One or more feedback headers may be sent by the MSS at once if one header is not enough to contain all the feedback information to be sent by the MSS.

The "Feedback Type" field is set to indicate the type of feedback. In the feedback header, without the use of the "Basic CID field" there are 32 bits of payload for the purpose of MIMO feedback.

The mapping of feedback information bits onto the Feedback header is provided by filling the payload field in the first MIMO feedback header and then the second, until preferably all the information bits are mapped.

STTD/SM TDD Feedback Options

For time division duplex (TDD) MIMO channel feedback, STTD/SM mode information can be handled in a similar manner that that of the as the STTD/SM FDD case above.

SVD TDD Feedback Options

For TDD MIMO channel feedback, SVD mode information can be handled by any one of several different embodiments. A first embodiment involves assigning one or more dedicated fast feedback channels to provide MIMO channel feedback in a similar manner to the SVD method for FDD.

In a second embodiment no explicit H or W or V is fed back to the BS. A fast feedback channel is designed so that the sub-carriers (48 sub-carriers) are distributed across a whole band in one or more OFDM symbol. At the MSS side, the MSS transmits a CQI payload. At the BS side, the BS can decode CQI payload and at the same time, derives the channel information from the UL received CQI signal using a appropriate algorithm.

In a third embodiment, no explicit H or W or V is fed back to the BS. A fast feedback channel is designed so that preferably the sub-carriers (48 sub-carriers) are distributed across a whole band in one OFDM symbol. The MSS transmits the CQI payload and a predetermined pilot pattern in a TDM fashion. When the MSS sends CQI, the CQI payload is transmitted. When the MSS transmits a pilot, the pilot is directly mapped to the 48 sub-carriers. The BS derives required channel information from the UL pilot.

Numerous modifications and variations of the present invention are possible in light of the above teachings. It is therefore to be understood that within the scope of the appended claims, the invention may be practiced otherwise than as specifically described herein.

The invention claimed is:

1. A wireless terminal, comprising:
    transmit circuitry;
    receive circuitry;
    a baseband processor coupled to the transmit circuitry and the receive circuitry; and
    a control system coupled to the baseband processor, wherein the control system is configured to receive a downlink data frame having information elements in an uplink resource allocation portion wherein the downlink data frame has at least one information element indicating whether an uplink resource is to be dedicated or not dedicated and, wherein, for at least one uplink resource allocation, the information elements indicate:
        a feedback type requested by a base station from a mobile station, wherein the feedback type includes an indication of MIMO mode and permutation mode settings; and
        a location of a subsequent uplink data frame when feedback information requested by the base station is to be provided by the mobile station on the allocated uplink resource, wherein the location is specified with reference to the downlink data frame,
    wherein the transmit circuitry is configured to transmit the feedback information requested by the base station on the allocated uplink resource.

2. The wireless terminal of claim 1, wherein, when the uplink resource is to be dedicated, the downlink data frame has at least one information element providing location information for the uplink resource.

3. The wireless terminal of claim 1, wherein the downlink data frame has at least one information element indicating a total number of uplink resource allocations for each uplink data frame having feedback data.

4. The wireless terminal of claim 1, wherein the downlink data frame has, for each uplink resource allocation, an identifier of the wireless terminal for which the uplink resource allocation is made.

5. The wireless terminal of claim 4, wherein the control system is operable, when an uplink channel is currently not de-allocated, to receive a downlink data frame indicating a format index for indicating a type of feedback information pertaining to a transmission channel between the base station and the wireless terminal.

6. The wireless terminal of claim 5, wherein the control system is operable to receive a downlink data frame indicating a total number of uplink channel resource assignments, the identifier, a location of a subsequent uplink data frame with reference to the downlink data frame indicating when feedback information requested by the base station will be received on an allocated uplink resource, a total number of uplink channels and the format index in a format of a channel allocation information element.

7. The wireless terminal of claim 1, wherein the downlink data frame comprises an indication, for each uplink channel assigned to the wireless terminal, of an uplink channel type.

8. The wireless terminal of claim 1, wherein the downlink data frame comprises an indication of a location of one or more uplink channel resources in a subsequent uplink data frame.

9. The wireless terminal of claim 1, wherein the control system is operable, to transmit to a base station feedback information in a Media Access Control (MAC) feedback protocol data unit (PDU) of a data frame, the feedback information comprising feedback type and feedback content including an indication of MIMO mode and permutation mode settings.

10. The wireless terminal of claim 1, wherein, when the at least one information element indicates that the uplink resource is to be dedicated, the information elements further indicate:
a repetition coding indication.

11. A method in a wireless terminal for enabling feedback in an uplink transmission of a communication system from a wireless terminal to a base station, the method comprising:
the wireless terminal receiving:
a location in a data frame for allocating requested feedback information to be transmitted to the base station, wherein the wireless terminal receives the location in an information element in an uplink resource allocation portion of the data frame,
at least one information element indicating whether an uplink resource is to be dedicated or not dedicated, and
a format index for indicating a type of feedback information, to be transmitted by the wireless terminal, pertaining to a transmission channel between the base station and the wireless terminal, wherein the format index is an indication of a particular format to be used in transmitting feedback information from the wireless terminal to the base station; and
the wireless terminal transmitting the feedback information requested by the base station on the allocated uplink resource.

12. The method of claim 11, wherein the wireless terminal receiving comprises receiving: an indication of a total number of feedback channel resource assignments for the data frame, an identifier associated with the respective wireless terminal for which the feedback channel resource assignment is being assigned, location information for a feedback resource, and a total number of allocated feedback channels.

13. The method of claim 11, wherein the information element comprises a feedback polling information element.

14. The method of claim 11, wherein the information element comprises a feedback type and a temporarily allocated feedback channel in the data frame for the wireless terminal.

15. The method of claim 11, wherein the information element comprises channel quality indicator information.

16. A method in a wireless terminal for enabling feedback in an uplink transmission of a closed-loop communication system from a wireless terminal to a base station, the method comprising:
the wireless terminal receiving a request message for feedback to be transmitted from the wireless terminal, the format of the feedback determined by a format index that indicates a transmission format of feedback content to be transmitted from the wireless terminal to the base station, and at least one information element indicating whether an uplink resource is to be dedicated or not dedicated; and
the wireless terminal transmitting the feedback requested by the base station on the uplink resource.

17. The method of claim 16, wherein the method further comprises:
the wireless terminal receiving an allocation of uplink resources comprising at least one feedback channel in one or more data frames on which the wireless terminal transmits the requested feedback information to the base station.

18. The method of claim 16, wherein the method further comprises:
the wireless terminal receiving from the base station:
an indication of a total number of feedback channel resource assignments for the one or more data frames;
for each feedback channel resource assignment within the total number of feedback resource assignments, the wireless terminal receiving: an identifier associated with a respective wireless terminal for each feedback channel resource assignment; a location of the feedback channel resources in the one or more data frames.

19. The method of claim 16, wherein the method further comprises, when a feedback channel is not currently de-allocated, the wireless terminal receiving from the base station: a total number of feedback channels allocated to the respective wireless terminal associated with the identifier.

* * * * *

UNITED STATES PATENT AND TRADEMARK OFFICE
CERTIFICATE OF CORRECTION

PATENT NO. : 10,263,677 B2
APPLICATION NO. : 14/685252
DATED : April 16, 2019
INVENTOR(S) : Hang Zhang et al.

Page 1 of 1

It is certified that error appears in the above-identified patent and that said Letters Patent is hereby corrected as shown below:

On the Title Page

Item (60) should be replaced with the following line:
"continuation of application No. 11/630,385, filed on Dec. 22, 2006, now Pat. No. 8,116,262, which is a National Stage Entry of PCT/CA2005/000959, filed on Jun. 22, 2005, which claims priority from provisional application No. 60/642,697, filed on Jan. 10, 2005, provisional application No. 60/619,461, filed on Oct. 15, 2004, provisional application No. 60/614,621, filed on Sep. 30, 2004, provisional application No. 60/601,178, filed on Aug. 13, 2004, provisional application No. 60/582,298, filed on Jun. 24, 2004, and provisional application No. 60/581,356, filed on Jun. 22, 2004."

Signed and Sealed this
Twenty-eighth Day of April, 2020

Andrei Iancu
*Director of the United States Patent and Trademark Office*